(12) United States Patent
Yoshida

(10) Patent No.: US 12,283,032 B2
(45) Date of Patent: Apr. 22, 2025

(54) IMAGE PROCESSING DEVICE, IMAGE PROCESSING METHOD, IMAGE CAPTURING APPARATUS, AND IMAGE PROCESSING SYSTEM

(71) Applicant: Kazuhiro Yoshida, Kanagawa (JP)

(72) Inventor: Kazuhiro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 252 days.

(21) Appl. No.: 17/794,632

(22) PCT Filed: Feb. 1, 2021

(86) PCT No.: PCT/IB2021/050764
§ 371 (c)(1),
(2) Date: Jul. 22, 2022

(87) PCT Pub. No.: WO2021/181170
PCT Pub. Date: Sep. 16, 2021

(65) Prior Publication Data
US 2023/0074704 A1    Mar. 9, 2023

(30) Foreign Application Priority Data
Mar. 10, 2020   (JP) ................ 2020-041189

(51) Int. Cl.
*G06T 5/80*    (2024.01)
*G06T 3/4038*  (2024.01)
(Continued)

(52) U.S. Cl.
CPC ............ *G06T 5/80* (2024.01); *G06T 3/4038* (2013.01); *G06T 5/50* (2013.01); *G06T 5/73* (2024.01); *G06T 2207/20212* (2013.01)

(58) Field of Classification Search
None
See application file for complete search history.

(56) References Cited

U.S. PATENT DOCUMENTS 10,462,384 B2    10/2019  Abbas et al.
2004/0061802 A1   4/2004  Yoshida
(Continued)

FOREIGN PATENT DOCUMENTS

| EP | 2280553 A2 | 2/2011 |
|---|---|---|
| JP | 2003-199034 | 7/2003 |
| JP | 2015-019344 | 1/2015 |

OTHER PUBLICATIONS

International Search Report issued on Apr. 30, 2021 in PCT/IB2021/050764 filed on Feb. 1, 2021, 14 pages.
(Continued)

*Primary Examiner* — Delomia L Gilliard
(74) *Attorney, Agent, or Firm* — XSENSUS LLP

(57) ABSTRACT

An image processing device includes: a determination means for determining an image capturing means used for capturing at least one particular portion in a combined image in which a first partial image captured using a first image capturing means and a second partial image captured using a second image capturing means are stitched together; and a correction means for applying image correction to the combined image based on a determination result of the determination means.

18 Claims, 36 Drawing Sheets

(51) Int. Cl.
*G06T 5/50* (2006.01)
*G06T 5/73* (2024.01)

(56) References Cited

U.S. PATENT DOCUMENTS

| | | |
|---|---|---|
| 2008/0074535 A1 | 3/2008 | Ohsuga et al. |
| 2011/0128436 A1 | 6/2011 | Ohsuga et al. |
| 2013/0076936 A1 | 3/2013 | Yoshida |
| 2014/0347526 A1 | 11/2014 | Hara et al. |
| 2015/0215595 A1 | 7/2015 | Yoshida |
| 2016/0050369 A1 | 2/2016 | Takenaka et al. |
| 2016/0212336 A1 | 7/2016 | Takenaka et al. |
| 2017/0094169 A1 | 3/2017 | Yoshikawa et al. |
| 2018/0182065 A1 | 6/2018 | Yoshida et al. |
| 2018/0184001 A1 | 6/2018 | Yoshida et al. |
| 2018/0332206 A1* | 11/2018 | Meler .................... G02B 13/06 |
| 2018/0332221 A1 | 11/2018 | Takenaka et al. |
| 2019/0340737 A1 | 11/2019 | Kawaguchi et al. |
| 2019/0347766 A1 | 11/2019 | Kawaguchi et al. |
| 2019/0347775 A1 | 11/2019 | Suitoh et al. |
| 2020/0007763 A1 | 1/2020 | Takenaka et al. |
| 2020/0151856 A1* | 5/2020 | Dargis ................... A61B 6/463 |
| 2020/0236277 A1 | 7/2020 | Odamaki et al. |
| 2021/0233209 A1* | 7/2021 | Yoshida .................... G06T 5/50 |

OTHER PUBLICATIONS

A Vetro et al., "Overview of the Stereo and Multiview Video Coding Extensions of the H.264/MPEG-4 AVC Standard", Proceedings of The IEEE, vol. 99, No. 4, Apr. 1, 2011 (Apr. 1, 2011), p. 626-642.

* cited by examiner

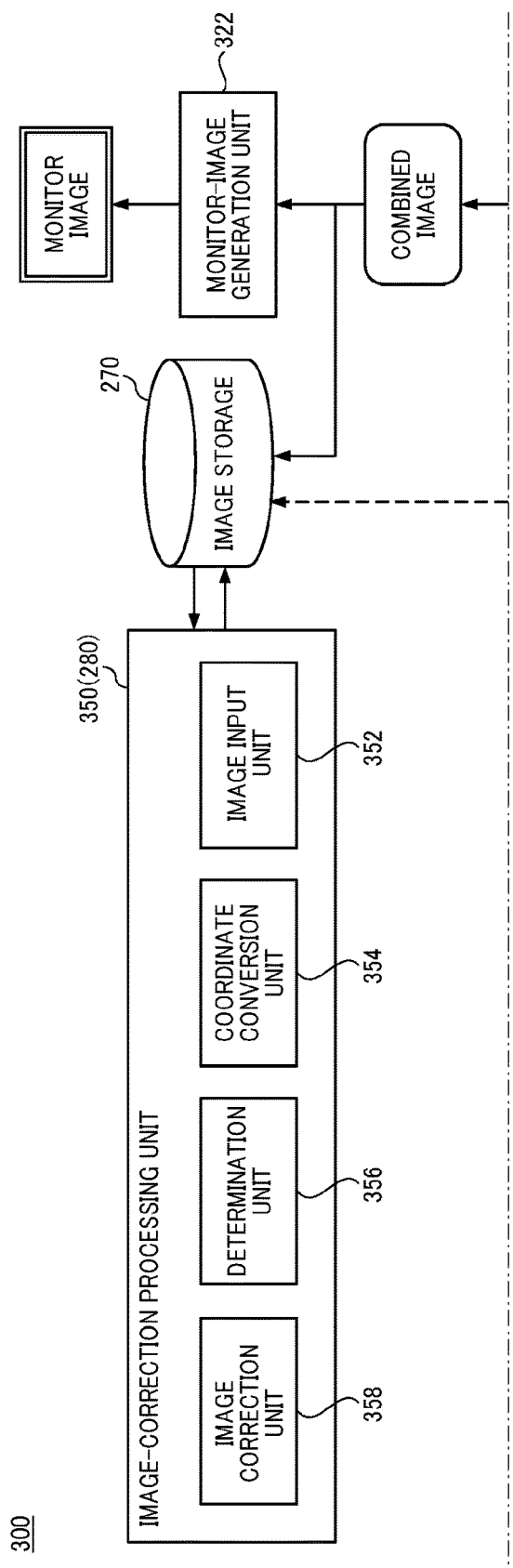

FIG. 7A

| COORDINATE VALUES AFTER CONVERSION | | COORDINATE VALUES BEFORE CONVERSION | |
|---|---|---|---|
| $\theta$(pix) | $\Phi$(pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

FIG. 10

| COORDINATE VALUES AFTER CONVERSION || STITCHING POSITION (SHIFT AMOUNT) ||
|---|---|---|---|
| $\theta$(pix) | $\varphi$(pix) | $\Delta\theta$(pix) | $\Delta\varphi$(pix) |
| 0 | 0 | | |
| 1 | 0 | | |
| ⋮ | ⋮ | ⋮ | ⋮ |
| 3598 | 1799 | | |
| 3599 | 1799 | | |

FIG. 12A

| COORDINATE VALUES AFTER CONVERSION | | COORDINATE VALUES BEFORE CONVERSION | | | STITCHING POSITION (SHIFT AMOUNT) | |
|---|---|---|---|---|---|---|
| θ(pix) | φ(pix) | IDENTIFI-CATION | x (pix) | y (pix) | Δθ(pix) | Δφ(pix) |
| 0 | 0 | | | | | |
| 1 | 0 | | | | | |
| ... | ... | ... | ... | ... | ... | ... |
| 3598 | 1799 | | | | | |
| 3599 | 1799 | | | | | |

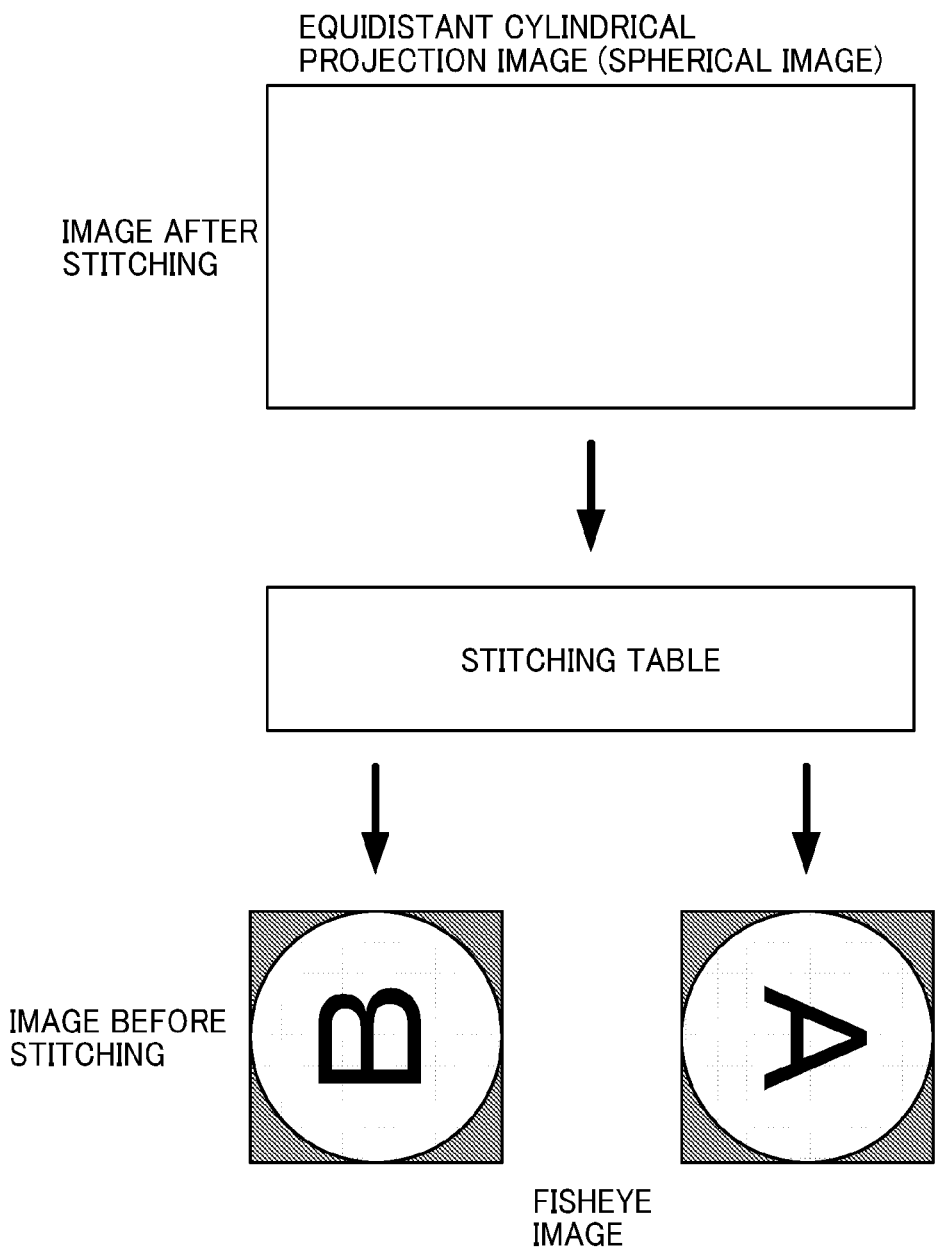

FIG. 13A

| COORDINATE VALUES OF IMAGE AFTER CORRECTION | | COORDINATE VALUES OF IMAGE BEFORE CORRECTION | | CORRECTION METHOD | |
|---|---|---|---|---|---|
| θ(pix) | φ(pix) | θ(pix) | φ(pix) | CORRECTION MODE | CORRECTION AMOUNT |
| 0 | 0 | | | | |
| 1 | 0 | | | | |
| ... | ... | ... | ... | ... | ... |
| θa | φa | θb | φb | 1 | n |
| ... | ... | ... | ... | ... | ... |
| 3598 | 1799 | | | | |
| 3599 | 1799 | | | | |

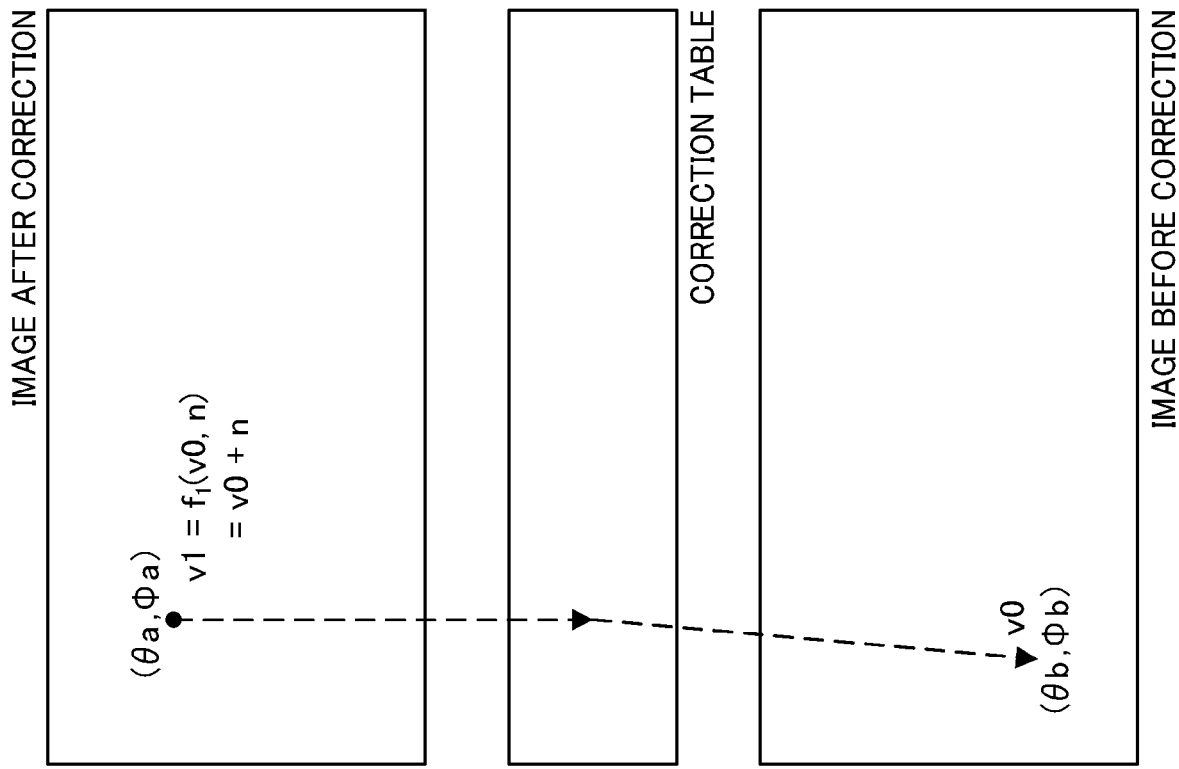

FIRST STITCHING CONVERSION

WITH COORDINATE-VALUE CORRECTION

WITHOUT COORDINATE-VALUE CORRECTION

| IMAGE HEIGHT | A | B |
|---|---|---|
| 0.0 | ka0 | kb0 |
| 0.1 | ka1 | kb1 |
| ... | ... | ... |
| 0.9 | ka9 | kb9 |
| 1.0 | ka10 | kb10 |

TIME

INAPPROPRIATELY
CORRECTED PORTION

| TIME | A | | | B | | |
|---|---|---|---|---|---|---|
| | X | Y | Z | X | Y | Z |
| T1 | ax1 | ay1 | az1 | bx1 | by1 | bz1 |
| T2 | ax2 | ay2 | az2 | bx2 | by2 | bz2 |
| ... | ... | ... | ... | ... | ... | ... |
| T8 | ax8 | ay8 | az8 | bx8 | by8 | bz8 |
| T9 | ax9 | ay9 | az9 | bx9 | by9 | bz9 |

| ROTATION CONVERSION | | ZENITH CORRECTION | | |
|---|---|---|---|---|
| ROTATION AXIS | ANGLE OF ROTATION | X | Y | Z |
| Z | −90 | | | |

IMAGE PROCESSING DEVICE, IMAGE PROCESSING METHOD, IMAGE CAPTURING APPARATUS, AND IMAGE PROCESSING SYSTEM

CROSS-REFERENCE TO RELATED APPLICATIONS

The present application is based on PCT filing PCT/IB2021/050764, filed Feb. 1, 2021, which claims priority to Japanese Patent Application No. 2020-041189, filed Mar. 10, 2020, the entire contents of each are incorporated herein by its reference.

TECHNICAL FIELD

The present disclosure relates to an image processing device, an image processing method, an image capturing apparatus, and an image processing system.

BACKGROUND ART

In related art, an image capturing apparatus that captures images in all directions performs processes of capturing a plurality of images using a plurality of wide-angle lenses (or fisheye lenses), correcting distortion and converting projection of the plurality of images, and stitching partial images captured by the respective lenses to provide a spherical image. As a process of stitching images, there is known a technique that uses a pattern matching method or the like for an overlapping area of partial images to detect a position at which captured images of an object overlap with each other and to stitch the images.

In some cases, it is desirable to posteriorly apply an image correction process to an existing image when a new image processing technique is developed. There is also an image correction process desirable to be performed in accordance with the characteristics of an image capturing element or an optical system (lenses and so forth).

After the images are stitched once; however, the system of related art is not able to simply apply information on the optical system or the image capturing element during capturing, and hence the image correction technique dependent on the image capturing element or the optical system is not appropriately applied from the image. A method of saving a stitched image and images before stitching is expected. However, an excessive storage capacity is required, possibly increasing the cost.

JP-2003-199034-A discloses a method of storing a plurality of still images for forming a panoramic image. JP-2003-199034-A discloses storing a plurality of still images in a memory, and calculating a panoramic parameter between a current image and a previous image stored in the memory and storing the panoramic parameter in the memory. JP-2003-199034-A, however, does not disclose that a plurality of images captured using a plurality of optical systems and a plurality of image capturing elements corresponding to the optical systems are stitched together to create an image, nor that after the images are stitched together, an image correction technique dependent on an image capturing means, such as the image capturing elements or the optical systems, is applied.

CITATION LIST

[Patent Literature]
[PTL 1]
  JP-2003-199034-A

SUMMARY OF INVENTION

Technical Problem

The present disclosure is made in light of the above-described points, and an object of the disclosure is to provide an image processing device capable of applying an image correction technique corresponding to a plurality of image capturing means to images captured using the plurality of image capturing means.

Solution to Problem

To address the above-described disadvantages, the present disclosure provides an image processing device according to an embodiment of the present disclosure having the following features. The image processing device includes a determination means for determining an image capturing means used for capturing at least one particular portion in a combined image in which a first partial image captured using a first image capturing means and a second partial image captured using a second image capturing means are stitched together. The image processing device further includes a correction means for applying image correction to the combined image based on a determination result of the determination means.

Advantageous Effects of Invention

With the above-described configuration, the image correction technique corresponding to the plurality of image capturing means is applicable to images captured by the plurality of image capturing means.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIGS. 4A and 4B (FIG. 4) are a major functional block relating to an image stitching process and a subsequent image correction process implemented in the spherical camera according to the embodiment.

FIGS. 7A and 7B (FIG. 7) illustrate conversion data referenced by a position-detection distortion correction unit and an image-combination distortion correction unit according to the embodiment.

FIG. 10 illustrates a data structure of a stitching-position detection result according to the embodiment.

FIGS. 12A and 12B (FIG. 12) illustrate stitching information stored in an image storage in association with image data according to the embodiment.

FIGS. 13A, 13B, and 13C (FIG. 13) illustrate an image correction method using a correction table according to the embodiment.

DESCRIPTION OF EMBODIMENTS

Figure 1:
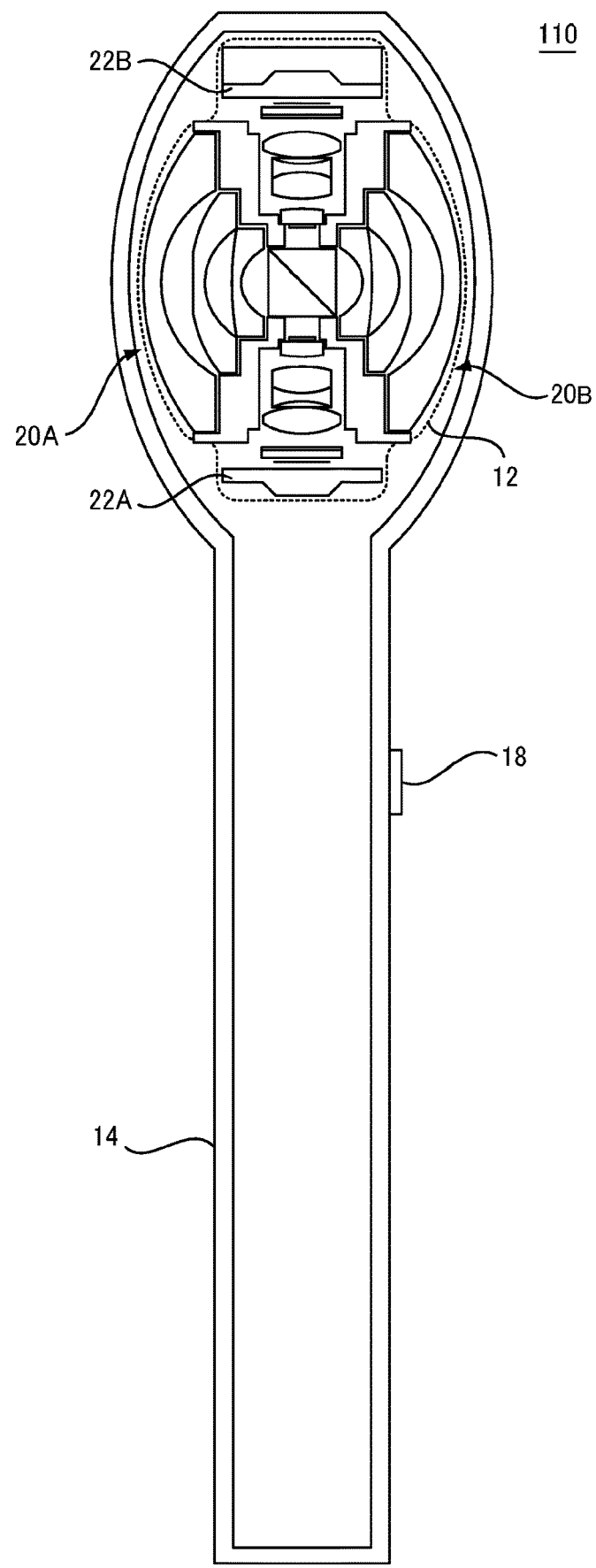
FIG. 1 is a sectional view of a spherical camera according to an embodiment.

Embodiments will be described below; however, embodiments are not limited to the embodiments described below. As used herein, the singular forms "a", "an" and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. An embodiment is described below using a spherical camera 110 including two fisheye lenses (wide-angle lenses) as an example of an image processing device, an image processing system, and an image capturing apparatus. While two fisheye lenses are used in the following embodiment, three or more fisheye lenses may be used.

Configuration of Spherical Camera: The general arrangement of the spherical camera 110 according to the embodiment is described with reference to FIGS. 1 and 2. FIG. 1 is a sectional view of the spherical camera 110 according to the embodiment. The spherical camera 110 illustrated in FIG. 1 includes an image capturing device 12; a housing 14 that holds the image capturing device 12 and components, such as a controller and a battery; and an operation button 18 provided at the housing 14.

The image capturing device 12 illustrated in FIG. 1 includes two image forming optical systems 20A and 20B and two image capturing elements 22A and 22B. The image capturing elements 22A and 22B are charge coupled device (CCD) sensors or complementary metal oxide semiconductor (CMOS) sensors. The image forming optical systems 20A and 20B each include, for example, a fisheye lens including seven lenses in six groups. According to the embodiment illustrated in FIG. 1, the fisheye lens has a full angle of view that is larger than 180 degrees (=360/n degrees, where n is the number of optical systems, and in this case, n=2), and preferably has an angle of view of 190 degrees or more. A combination of one of such wide-angle image forming optical systems 20A and 20B and corresponding one of such image capturing elements 22A and 22B are referred to as a wide-angle image capturing optical system.

The positions of optical elements (lenses, prisms, filters, and aperture stops) of the two image forming optical systems 20A and 20B are determined relative to the image capturing elements 22A and 22B. The positions of the optical elements of the image forming optical systems 20A and 20B are each determined such that the optical axis of the image forming optical system 20A or 20B is orthogonal to the center of a light receiving area of the corresponding one of the image capturing elements 22A and 22B and such that the light receiving area defines an image forming surface of the corresponding fisheye lens.

The image forming optical systems 20A and 20B have the same specifications in the embodiment illustrated in FIG. 1. The image forming optical systems 20A and 20B are combined to be directed opposite to each other such that the optical axes of the image forming optical systems 20A and 20B agree with each other. The image capturing elements 22A and 22B each convert a distribution of received light into image signals, and sequentially output image frames to an image processing block on the controller. Although the details are described later, the images captured by the image capturing elements 22A and 22B are combined into an image having a solid angle of 4π steradians (hereinafter referred to as a "spherical image"). A spherical image is obtained by capturing images in all directions that can be seen from an image capturing point. In the embodiment described here, a spherical image is generated; however, a panoramic image obtained by capturing images in a horizontal plane for 360 degrees may be generated. Alternatively, an image obtained by capturing a portion of the entire area of a sphere or a portion of a 360-degree horizontal plane may be used. The spherical image can be saved as a still image or can be saved as a moving image.

Figure 2A:
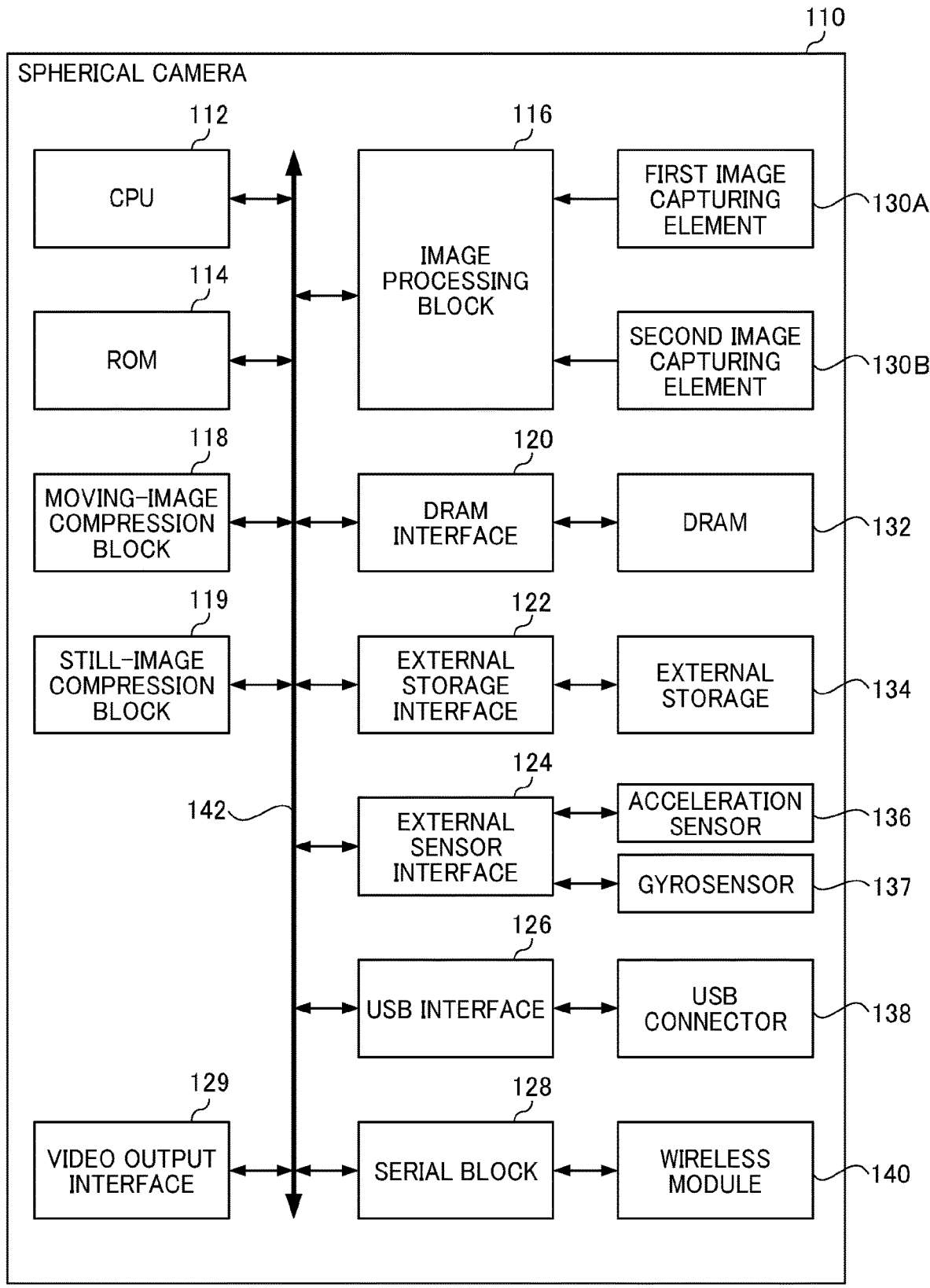
FIG. 2A illustrates a hardware configuration of the spherical camera according to the embodiment.

FIG. 2A illustrates a hardware configuration of the spherical camera 110 according to the embodiment. The spherical camera 110 includes a central processing unit (CPU) 112, a read-only memory (ROM) 114, an image processing block 116, a moving-image compression block 118, a dynamic random access memory (DRAM) 132 that is coupled via a DRAM interface 120, and an acceleration sensor 136 and a gyrosensor 137 that are coupled via an external sensor interface 124 (may be referred to as sensor interface), which are connected via a bus 142.

The CPU 112 controls operations of components and an overall operation of the spherical camera 110. The ROM 114 stores a control program described in a code interpretable by the CPU 112 and various parameters. The image processing block 116 is coupled to two image capturing elements 130A and 130B (which correspond to the image capturing elements 22A and 22B in FIG. 1) and receives image signals of images captured and input by the image capturing elements 130A and 130B. The image processing block 116 includes an image signal processor (ISP) and the like, and performs shading correction, Bayer interpolation, white balance correction, gamma correction, and the like on the image signals input from the image capturing elements 130A and 130B. The image processing block 116 further combines a plurality of images acquired from the image capturing elements 130A and 130B and hence generates the above-described spherical image.

The moving-image compression block 118 is a codec block that compresses and decompresses a moving image according to, for example, Moving Picture Experts Group-4 (MPEG-4) AVC/H.264. The moving-image compression block 118 is used for generating moving image data of the generated spherical image. The still-image compression block 119 is a codec block that compresses and decompresses a still image according to, for example, Joint Photographic Experts Group (JPEG) or Tagged Image File Format (TIFF). The still-image compression block 119 is used for generating still image data of the generated spherical image. The DRAM 132 provides a storage area for temporarily storing data when various types of signal processing and image processing are applied to the data. The acceleration sensor 136 detects acceleration components of three axes. The acceleration components are used to detect the vertical direction to perform zenith correction on the spherical image. The gyrosensor 137 detects angular velocity components of three axes. The angular velocity components are used to detect the motion of the spherical camera 110 to correct blur. When the spherical camera 110 moves with acceleration, since the acceleration sensor 136 does not detect the vertical direction, the vertical direction is detected also using the data of the gyrosensor 137.

The spherical camera 110 further includes an external storage interface 122, a Universal Serial Bus (USB) interface 126, a serial block 128, and a video output interface 129. An external storage 134 is coupled to the external storage interface 122. The external storage interface 122 controls reading from and writing in the external storage 134 such as a memory card inserted into a memory card slot. For simplicity, the external storage 134 is illustrated within the spherical camera 110, but the external storage 134 may be removable from the spherical camera 110.

A USB connector 138 is coupled to the USB interface 126. The USB interface 126 controls USB communication with an external apparatus such as a personal computer (PC) that is coupled via the USB connector 138. The serial block 128 controls serial communication with an external apparatus such as a PC. A wireless module 140 is coupled to the serial block 128. The video output interface 129 is an interface for coupling with an external display such as High-Definition Multimedia Interface (HDMI, registered trademark). The video output interface 129 can output a captured image as a video to the external display or the like.

When the power is turned on by an operation with a power switch, the above-described control program is loaded in a main memory. The CPU 112 controls operations of components of the apparatus in accordance with the program loaded in the main memory, and temporarily stores data required for the control in the memory. Thus, functional units and processes (described later) of the spherical camera 110 are implemented.

Figure 3:
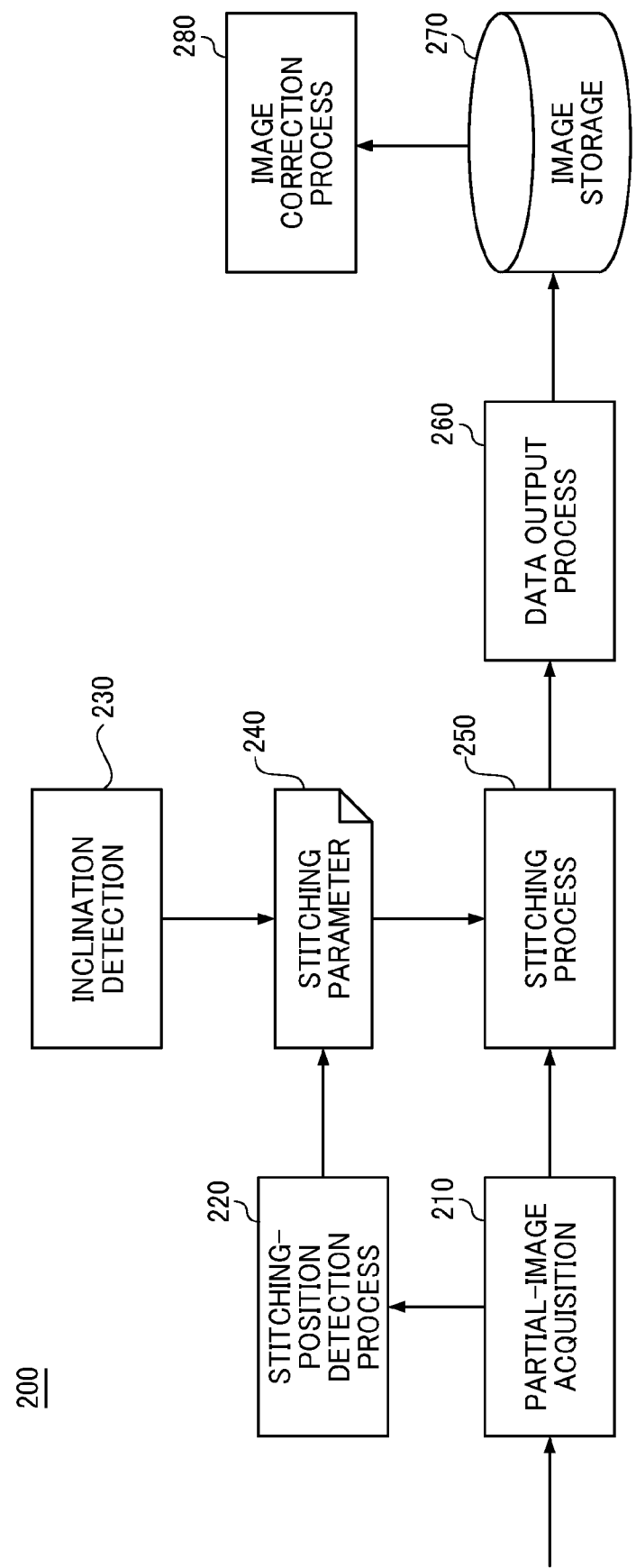
FIG. 3 schematically illustrates an image processing path of the spherical camera according to the embodiment.

Flow of General Processing Including Image Stitching Process and Subsequent Image Correction Process: An image stitching process and a subsequent image correction process of the spherical camera 110 are described below with reference to FIG. 3. FIG. 3 schematically illustrates an image processing flow in the spherical camera 110 according to the embodiment.

In a partial-image acquisition process 210, the spherical camera 110 controls the two image capturing elements 130A and 130B to sequentially capture images of continuous frames. An image captured by each of the image capturing elements 130A and 130B is a fisheye image that accommodates a substantially hemispherical portion of a sphere (in all directions) in a field of view and constitutes a partial image of a spherical image. Hereinafter, an image of each frame captured by each of the image capturing elements 130A and 130B is referred to as a partial image.

A stitching-position detection process 220 that detects a stitching position between two acquired partial images is executed. In the stitching-position detection process 220, a process of detecting a positional shift amount of each of a plurality of corresponding points in an overlapping area is performed per frame to generate a stitching-position detection result. The overlapping area exists between a plurality of partial images.

Subsequent to the stitching-position detection process 220, an inclination detection process 230 is executed. In the inclination detection process 230, the spherical camera 110 controls the acceleration sensor 136 and the gyrosensor 137 illustrated in FIG. 2A to detect an inclination of the spherical camera 110 with respect to a predetermined reference direction.

The predetermined reference direction is typically the vertical direction in which the gravitational acceleration acts. In the inclination detection process 230, the acceleration component for each of the three axes of the acceleration sensor 136 and the angular velocity component for each of the three axes of the gyrosensor 137 are measured per frame to generate an inclination detection result.

The stitching-position detection result obtained in the stitching-position detection process 220 and the inclination detection result obtained in the inclination detection process 230 constitute a stitching parameter 240 for combining a plurality of partial images of each frame.

The spherical camera 110 subsequently executes a stitching process 250 that stitches two partial images acquired in the partial-image acquisition process 210 based on the obtained stitching parameter 240. In the stitching process 250, the positions of a plurality of partial images are aligned at the stitching position based on the stitching-position detection result, and performs zenith correction based on the inclination detection result. Thus, the two partial images acquired in the partial-image acquisition process 210 are combined to generate a spherical image. In a case of three or more fisheye lenses, three or more partial images are combined to generate a spherical image.

Since the stitching position and inclination are detected per frame, the stitching parameter 240 is dynamically updated per frame. The stitching process is executed per frame by applying the stitching parameter 240 with these detection results reflected. Thus, even when the inclination or orientation of the spherical camera 110 changes or when a subject located near an overlapping area moves during capturing, an output image can be generated in a state in which the zenith correction and the stitching correction have been appropriately applied.

After the stitching process 250 is completed, the spherical camera 110 executes a data output process 260 to successively saves frames in an image storage 270, and to provide monitor displaying on a display included in the spherical camera 110, or to output data to an external user terminal apparatus from the spherical camera 110 and to provide monitor displaying on a display included in the external user terminal apparatus based on an output image.

In the motor displaying, an image on output data is displayed on the display included in the spherical camera 110 or on the display included in the external user terminal apparatus. For the monitor displaying, a spherical image may be displayed without a change, or an image may be generated by projecting a spherical image at a predetermined angle of view (an image may be extracted from a spherical image at a designated angle of view) and the generated image may be displayed.

Moreover, image correction may be posteriorly applied in an image correction process 280 to a stitched spherical image stored in the image storage 270. This will be described later in detail.

Figure 4B:
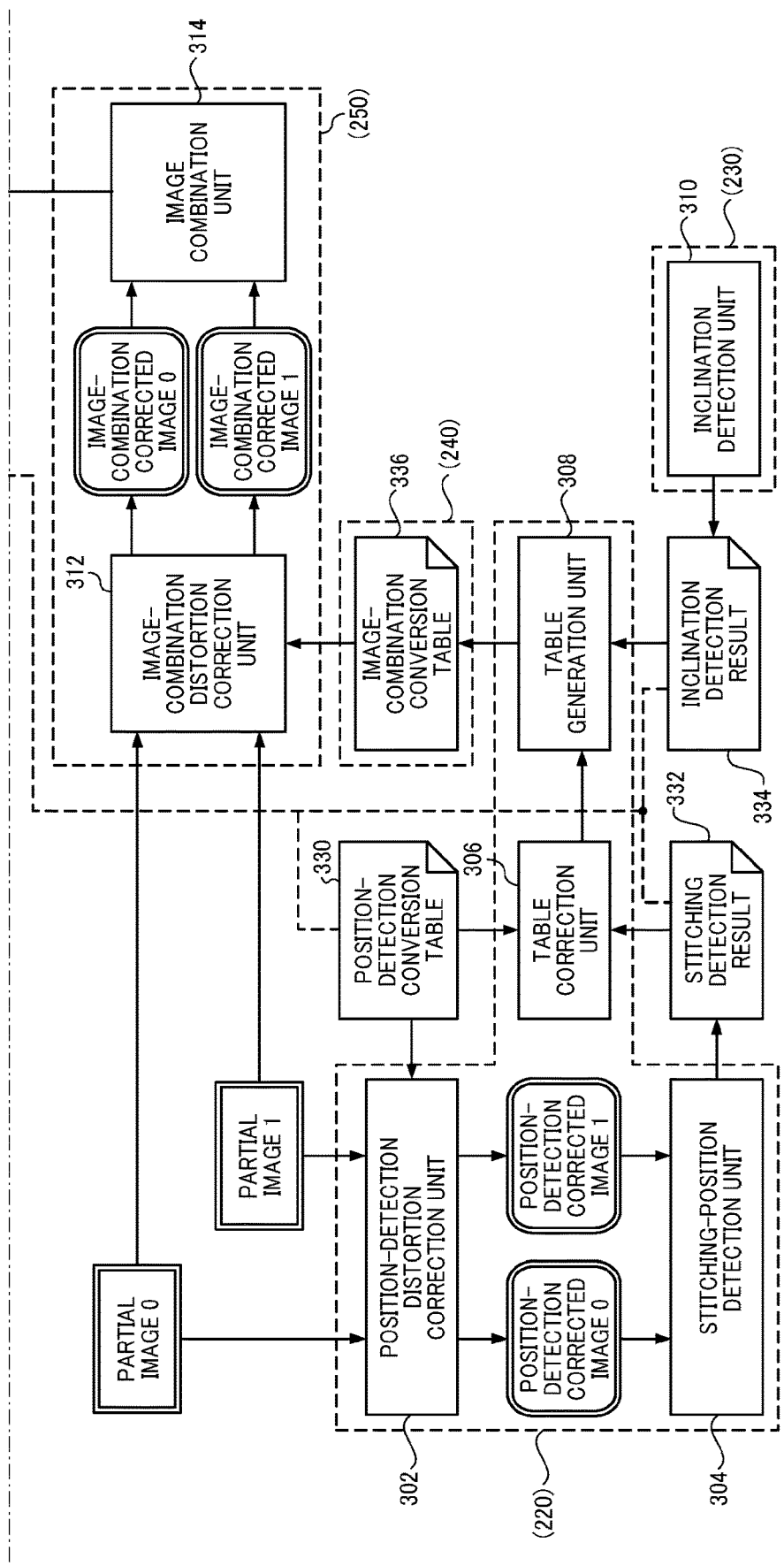

Detailed Description of Image Stitching Process: The details of the image stitching process are described below with reference to FIGS. 4 to 11. FIG. 4 is a major functional block implemented in the spherical camera 110 according to the embodiment. As illustrated in FIG. 4, an image processing block 300 according to the embodiment includes a position-detection distortion correction unit 302, a stitching-position detection unit 304, a table correction unit 306, a table generation unit 308, an inclination detection unit 310, an image-combination distortion correction unit 312, and an image combination unit 314.

Projection Method: The image processing block 300 receives two partial images per frame input from the two image capturing elements 130A and 130B after various types of image signal processing are applied to the two partial images. In this case, an image of a frame obtained by the image capturing element 130A as a source is referred to as a "partial image 0", and an image of a frame obtained by the image capturing element 130B as a source is referred to as a "partial image 1". The image processing block 300 further includes a position-detection conversion table 330 created in advance by a manufacturer or the like in accordance with a predetermined projection model, based on, for example, design data of the lens optical system of each of the image capturing elements 130A and 130B.

The position-detection distortion correction unit 302 applies distortion correction on the input partial images 0 and 1 using the position-detection conversion table 330 to generate a position-detection corrected image (hereinafter, occasionally merely referred to as a corrected image) 0 and a position-detection corrected image 1. The input partial images 0 and 1 are image data expressed in a plane coordinate system (x, y). In contrast, the corrected images with the distortion correction applied using the position-detection conversion table 330 are equidistant cylindrical projection image data expressed in a spherical coordinate system (which is a polar coordinate system having a radius vector of 1 and two amplitudes θ and φ).

Figure 5A:
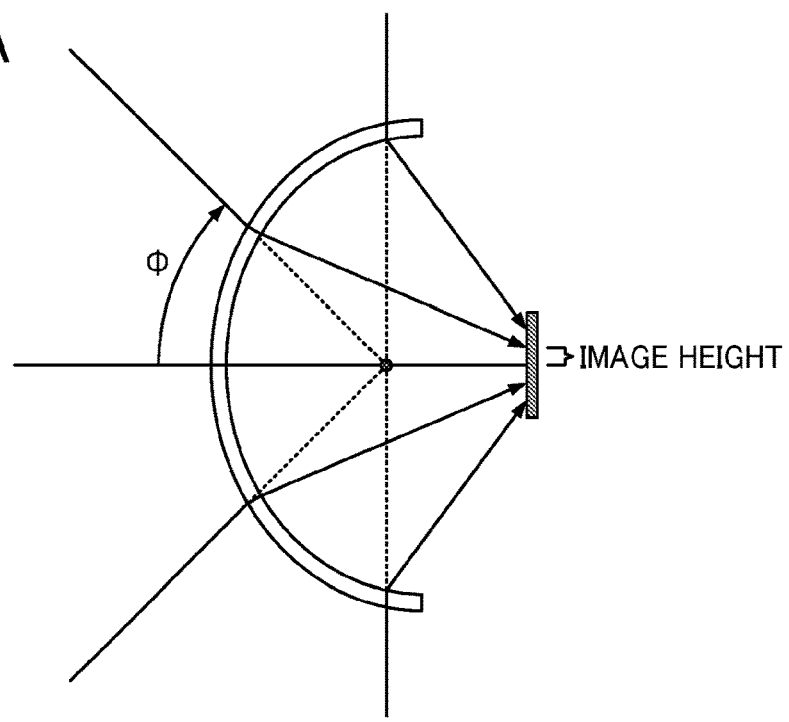
FIGS. 5A and 5B (FIG. 5) illustrate a projection relationship in the spherical camera according to the embodiment.
Figure 5B:
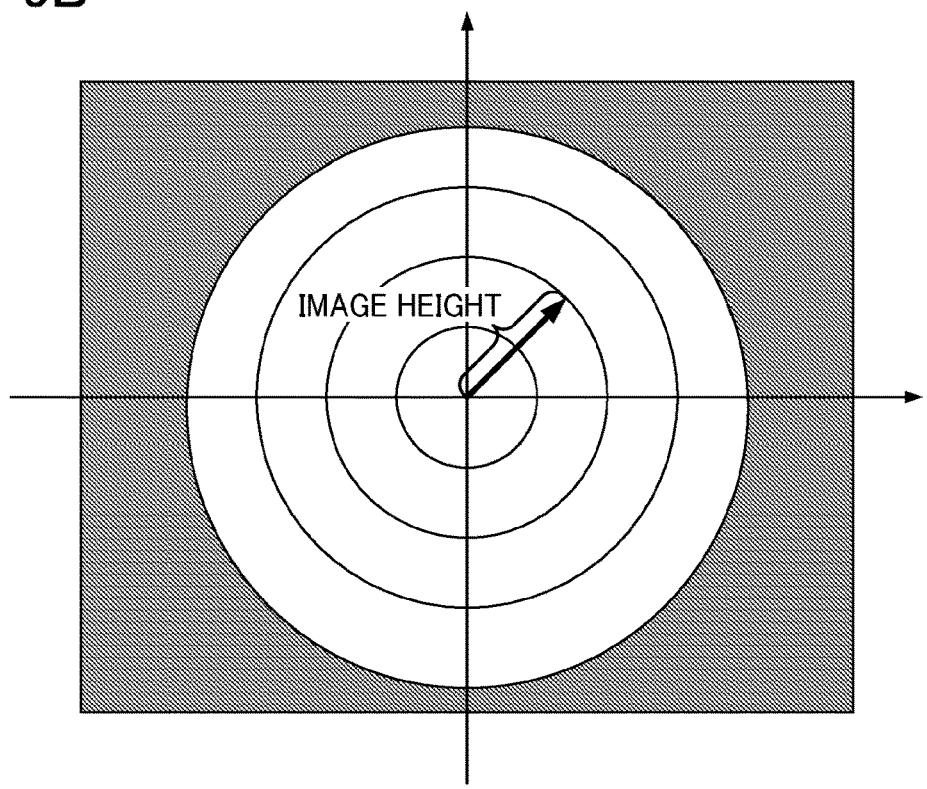

FIG. 5 illustrates a projection relationship in the spherical camera 110 according to the embodiment. An image captured by a fisheye lens is an image captured in directions for a substantially hemispherical portion from a capturing point. As illustrated in FIG. 5(A), the fisheye lens generates an image with an image height h corresponding to an incident angle φ with respect to the optical axis. The relationship between the image height h and the incident angle q is determined by a projection function corresponding to a predetermined projection model. The embodiment described here employs a configuration of a so-called circular fisheye lens having a smaller image circle diameter than an image diagonal line. A partial image to be obtained is a plane image including the entire image circle in which a substantially hemispherical portion of a capturing range is projected as illustrated in FIG. 5(B).

Figure 6A:
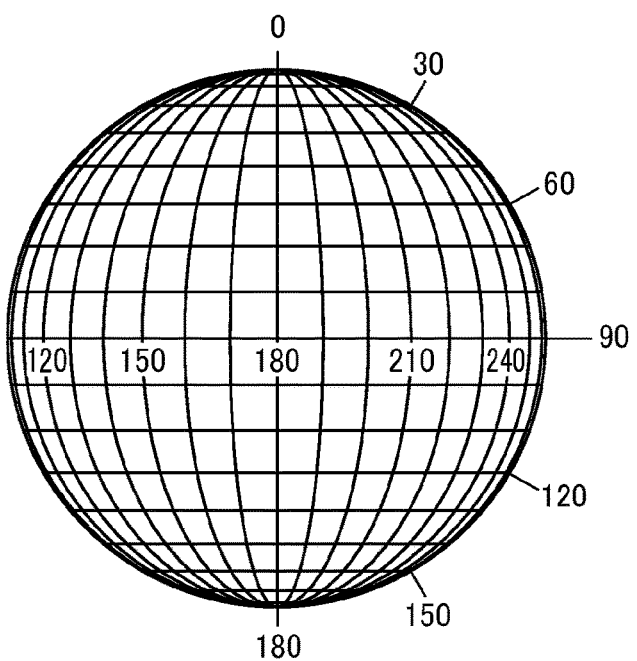
FIGS. 6A and 6B (FIG. 6) illustrate a data structure of image data in a format of an equidistant cylindrical projection image (spherical image) used in the embodiment.
Figure 6B:
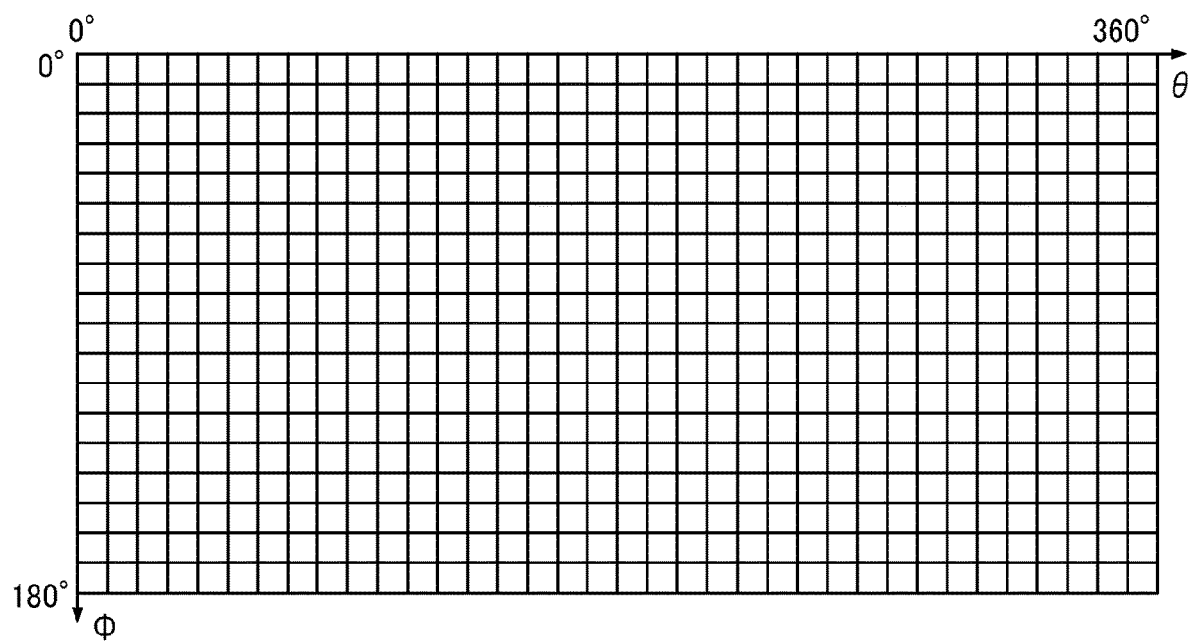

FIG. 6 illustrates a data structure of equidistant cylindrical projection image data used in the embodiment. As illustrated in FIG. 6, the equidistant cylindrical projection image data is expressed as an array of pixel values with coordinates of a vertical angle φ corresponding to an angle with respect to a predetermined axis and a horizontal angle θ corresponding to an angle of rotation around the axis. The coordinate values (θ, φ) are associated with each of points on a sphere that represents all directions centered at a capturing point, and all directions are mapped on an equidistant cylindrical projection image.

Figure 7B:
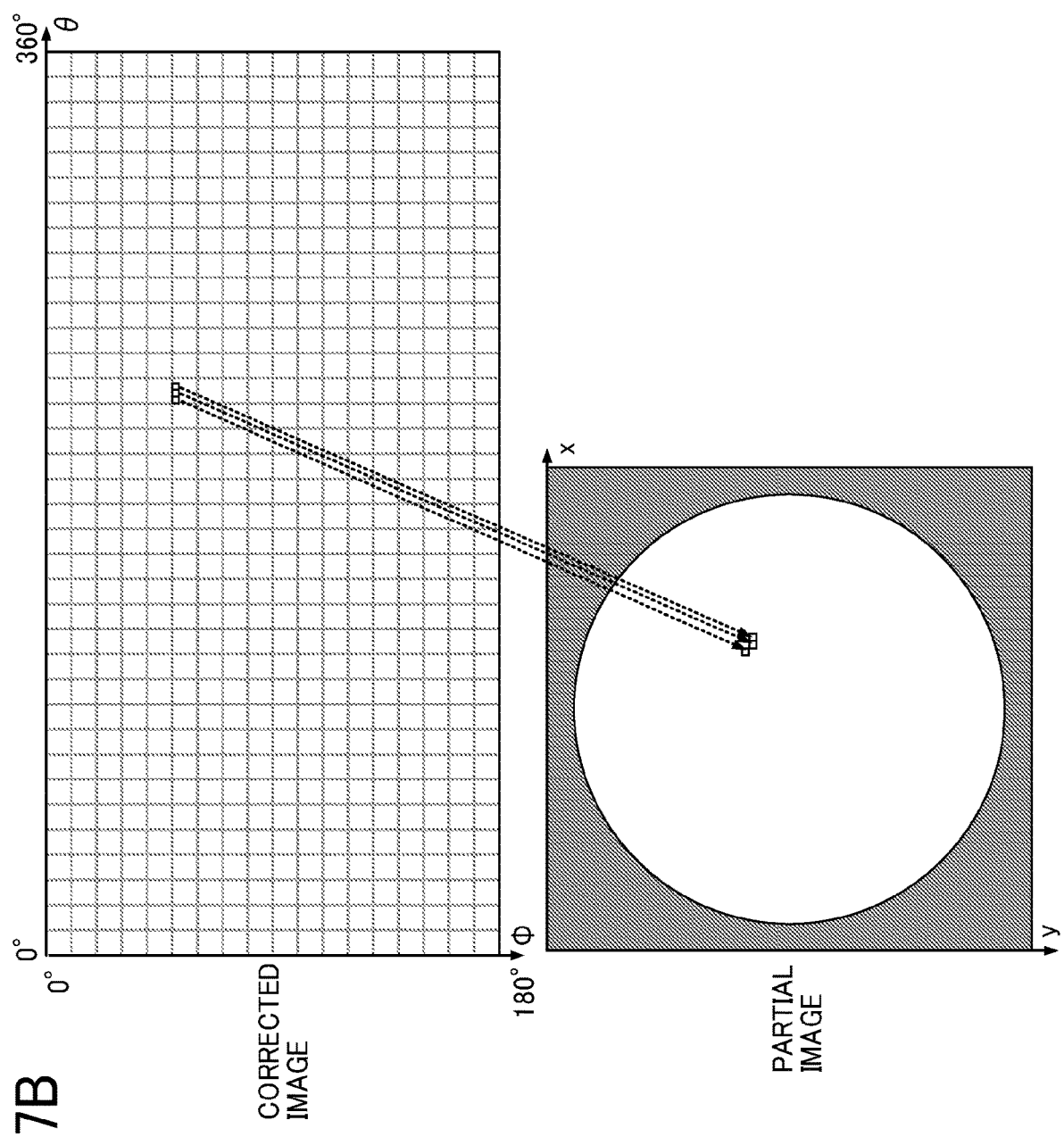

FIG. 7 illustrates conversion data referenced by the position-detection distortion correction unit 302 according to the embodiment. The conversion table 330 determines projection from a partial image expressed in a plane coordinate system to an image expressed in a spherical coordinate system. As illustrated in FIG. 7(A) and FIG. 7(B), the conversion table 330 holds information for associating coordinate values (θ, φ) of an image after correction with coordinate values (x, y) of a partial image before correction to be mapped at the coordinate values (θ, φ), for all coordinate values (θ, φ) per fisheye lens. In the example illustrated in FIG. 7, an angle assigned to a pixel is 1/10 degrees in either of the φ direction and the θ direction. The conversion table has information indicative of correspondence of 3600×1800 for each fisheye lens. The position-detection conversion table 330 that is used in the stitching-position detection is calculated in advance after correction on distortion with respect to an ideal lens model and is arranged in a table by a manufacturer or the like.

Figure 8:
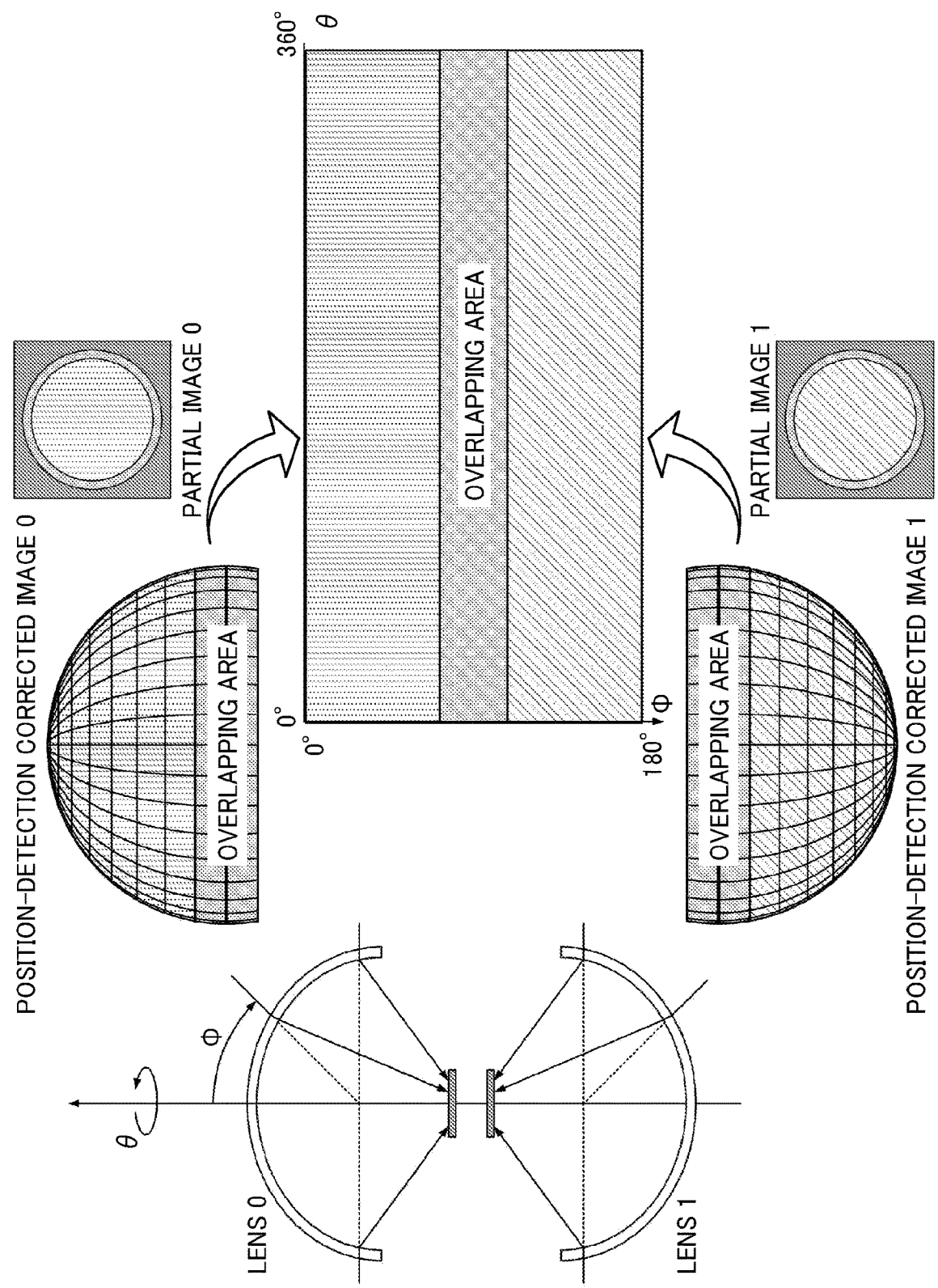
FIG. 8 illustrates mapping of partial images captured by two fisheye lenses into a spherical coordinate system in a position detection process according to the embodiment.

Stitching Position Detection: FIG. 8 illustrates mapping of partial images captured by the fisheye lenses into a spherical coordinate system in the position detection process according to the embodiment. As the result of the process by the position-detection distortion correction unit 302, the two partial images 0 and 1 captured by the fisheye lenses are developed in a spherical image format as illustrated in FIG. 8. A partial image 0 captured by the fisheye lens 0 is typically mapped on a substantially upper hemispherical portion of a sphere, and a partial image 1 captured by the fisheye lens 1 is typically mapped on a substantially lower hemispherical portion of the sphere. Since the fisheye lenses have full angles of view exceeding 180 degrees, the corrected image 0 and the corrected image 1 expressed in the spherical format protrude from their hemispherical portions. Consequently, when the corrected image 0 and the corrected image 1 overlap with each other, an overlapping area is generated in which capturing ranges of the images overlap with each other.

The stitching-position detection unit 304 receives inputs of the corrected images 0 and 1 converted by the position-detection distortion correction unit 302, detects a stitching position between the input corrected images 0 and 1 by a pattern matching process, and generates a stitching-position detection result 332. As illustrated in FIG. 8, the position-detection conversion table 330 according to the embodiment is created such that the optical axes of the two lens optical systems are projected on the two poles of a sphere and that an overlapping area between images is projected at a position near the equator of the sphere. In the spherical coordinate system, distortion increases toward a pole at which the vertical angle $\varphi$ is 0 degrees or 180 degrees, and stitching-position detection accuracy deteriorates. In contrast, since the above-described projection is employed, the stitching-position detection accuracy can be increased. FIG. 8 illustrates the mapping of the two partial images captured by the two fisheye lenses into the spherical coordinate system; however, three or more fisheye lenses may be used.

Figure 9:
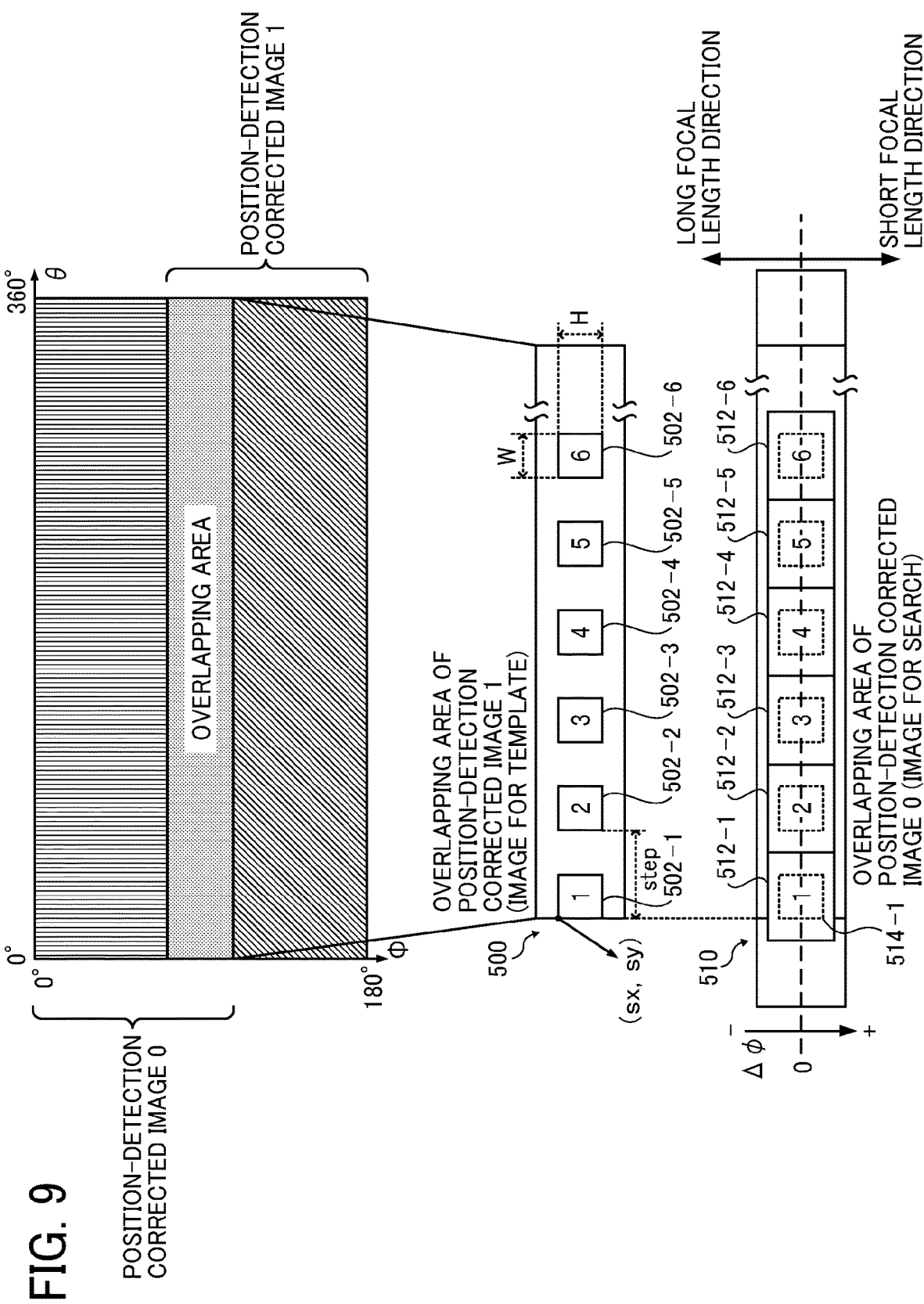
FIG. 9 illustrates a method of generating a template image by a template generation unit according to the embodiment.

FIG. 9 illustrates a stitching-position detection process according to the embodiment. In the embodiment described here, an image for template 500 is an image of a portion of the overlapping area of the position-detection corrected image 1, and an image for search 510 is an image of a portion of the overlapping area of the position-detection corrected image 0. When it is assumed that a template image is generated with a designated size W and a designated generation interval Step, a plurality of template images 502-1 to 502-# (502-1 to 502-6, for example) are generated in a form illustrated in FIG. 9.

A corresponding portion 514 on the image for search 510 is searched within a predetermined search range 512 through template matching, for the plurality of generated template images 502-1 to 502-#. A shift amount of a position with the maximum matching score from a reference position is detected, for each of the template images 502-1 to 502-#.

Stitching Parameter: FIG. 10 illustrates a data structure of a stitching-position detection result according to the embodiment. As illustrated in FIG. 10, data that holds information in which shift amounts ($\Delta\theta$, $\Delta\varphi$) are associated with coordinate values ($\theta$, $\varphi$) after conversion for all coordinate values is generated based on the stitching-position detection process. At this time, shift amounts ($\Delta\theta i$, $\Delta\varphi i$) per template block obtained by the stitching-position detection are set as values of center coordinates of the template block, and shift amounts ($\Delta\theta$, $\Delta\varphi$) corresponding to the coordinate values ($\theta$, $\varphi$) are interpolated to calculate stitching-position data.

The table correction unit 306 corrects the prepared position-detection conversion table 330 based on the stitching-position detection result 332 and gives the corrected position-detection conversion table 330 to the table generation unit 308. As illustrated in FIG. 10, since the shift amount is obtained per coordinate value in the spherical image format by the stitching-position detection, the table correction unit 306 corrects the corrected position-detection conversion table 330 to associate the input coordinate values ($\theta$, $\varphi$) with (x, y) which have been associated with ($\theta+\Delta\theta$, $\varphi+\Delta\varphi$) before the correction, in a detection distortion correction table 0 used for the distortion correction on the partial image 0. Note that the association need not be changed for a detection distortion correction table 1 used for the distortion correction of the partial image 1.

The table generation unit 308 generates an image-combination conversion table 336 from conversion data corrected by the table correction unit 306 based on rotation-coordinate conversion. At this time, the image-combination conversion table 336 can be generated by reflecting the inclination correction based on an inclination detection result 334 generated by the inclination detection unit 310.

In this way, the stitching position is detected per frame, and the image-combination conversion table 336 is updated. The processes to be executed by the position-detection distortion correction unit 302, the stitching-position detection unit 304, the table correction unit 306, and the table generation unit 308 correspond to the stitching-position detection process 220 illustrated in FIG. 3. The process to be executed by the inclination detection unit 310 corresponds to the inclination detection process 230. The image-combination conversion table 336 corresponds to the stitching parameter 240.

The image-combination distortion correction unit 312 applies the distortion correction to the partial image 0 and the partial image 1 using the image-combination conversion table 336 as a process before an image combination process to generate an image-combination corrected image 0 and an image-combination corrected image 1. The generated image-combination corrected images 0 and 1 are expressed in a spherical coordinate system like the position-detection corrected images, but have coordinate axes whose definitions differ from the definitions of the coordinate axes of the position-detection corrected images by the above-described rotation-coordinate conversion. The image combination unit 314 combines the obtained image-combination corrected image 0 and image-combination corrected image 1 to generate a frame of a combined image in the spherical image (equidistant cylindrical projection image) format.

Figure 11:
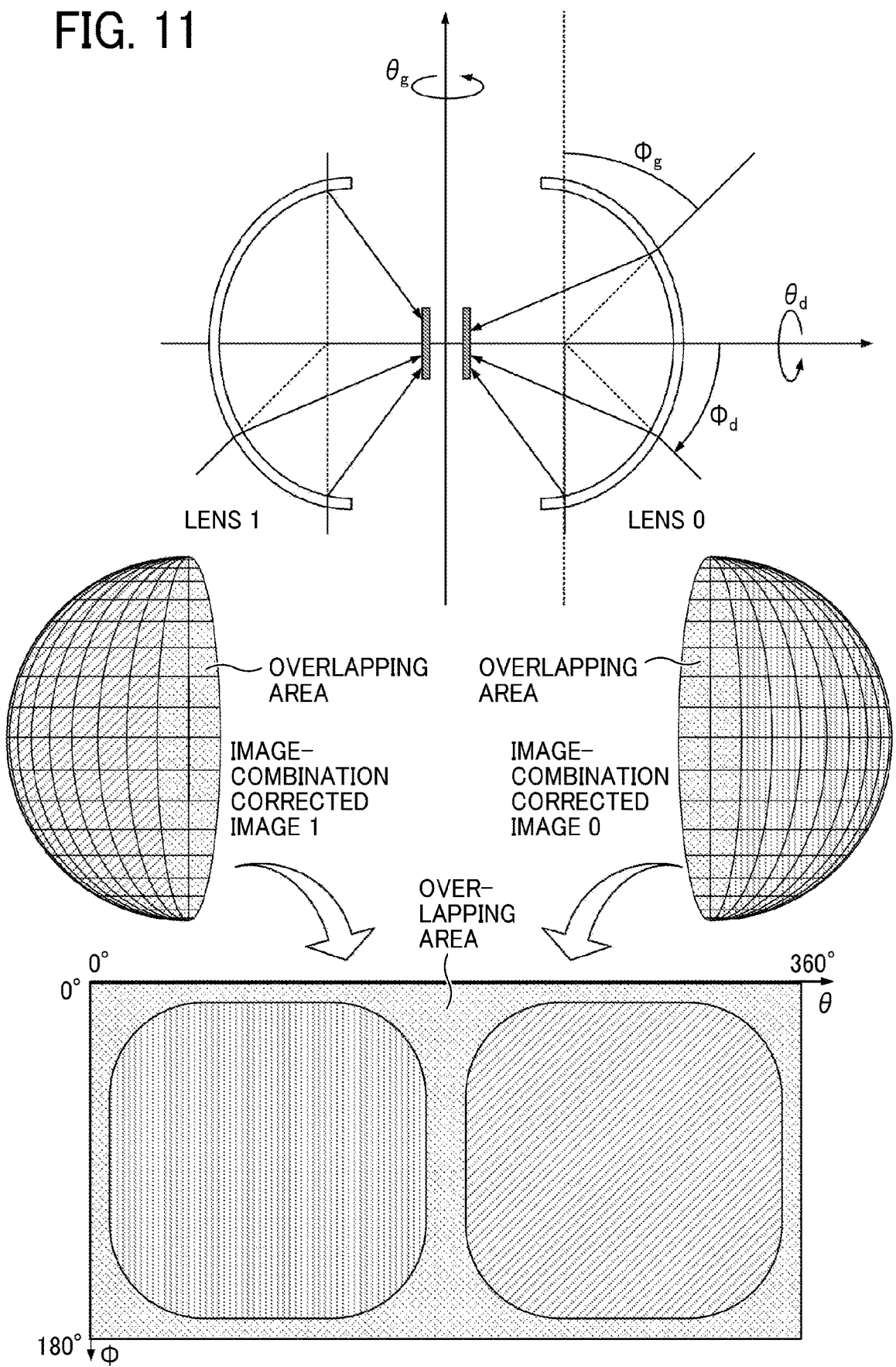
FIG. 11 illustrates mapping of partial images captured by two fisheye lenses into a spherical coordinate system in an image combination process according to the embodiment.

FIG. 11 illustrates mapping of partial images captured by the fisheye lenses into the spherical coordinate system in an image combination process according to the embodiment. By the above-described rotation-coordinate conversion, the definitions of the coordinate axes of the horizontal angle and the vertical angle based on the optical axis of one of the lens optical systems as illustrated in FIG. 8 are converted into the definitions of the coordinate axes of the horizontal angle and the vertical angle based on the axis perpendicular to the optical axis as illustrated in FIG. 11. As the result of the processing by the image-combination distortion correction unit 312, the two partial images 0 and 1 captured by the fisheye lenses are developed in the spherical image (equidistant cylindrical projection image) format as illustrated in FIG. 11. A partial image 0 captured by the fisheye lens 0 is typically mapped on a substantially left hemispherical portion of a sphere, and a partial image 1 captured by the fisheye lens 1 is typically mapped on a substantially right hemispherical portion of the sphere. While FIG. 11 illustrates the mapping of the two partial images captured by the two fisheye lenses into the spherical coordinate system, in a case of three or more fisheye lenses, three or more partial images are combined to generate a spherical image.

A stitching process is performed based on the image-combination conversion table 336. The processes to be executed by the image-combination distortion correction unit 312 and the image combination unit 314 correspond to the stitching process 250 illustrated in FIG. 3.

Displaying, Saving: The image processing block 300 illustrated in FIG. 4 may further include a monitor-image generation unit 322. The combined image generated as described above is expressed in the spherical image format. Hence, when the combined image is displayed on a flat displaying device such as a display without a change, the image is displayed with more distortion toward the vertical angles of 0 degrees and 180 degrees. According to a desirable embodiment, image processing for projecting a spherical image on a flat displaying device can be executed.

The monitor-image generation unit 322 performs a process of successively converting the combined image in the spherical image format from the spherical coordinate system into a plane coordinate system in a specific direction at a specific angle of view for projection on an image in a direction of a specific field of view designated by a user at a certain angle of view. Thus, a viewer can monitor an image corresponding to a case of observation at a predetermined viewpoint and in a predetermined field of view.

In the above description, displaying a monitor image before capturing or during capturing has been described. Alternatively, a still image of a spherical image generated by the above-described image processing path can be generated, or a moving image can be generated by compressing a series of images including a plurality of frames of a spherical image, and image data of the still image or the moving image can be saved.

As illustrated in FIG. 4, the image processing block 300 according to the embodiment further includes the image storage 270. The image storage 270 saves a still image or a moving image of a spherical image as image data. In the case of a still image, the still-image compression block 119 may compress the still image into image data in a still image format, such as JPEG or TIFF. In the case of a moving image, the moving-image compression block 118 may compress the moving image into image data in a moving image format such as MPEG-4 AVC/H.264. Then, the compressed image may be stored in the image storage 270. The image storage 270 is provided by a storage area of, for example, the external storage 134.

The processes of stitching partial images captured by using the combination of the plurality of fisheye lenses and the plurality of image capturing elements in the spherical camera 110 to generate a spherical image and storing the image have been described above.

In particular, in the above description, the case of performing the stitching process on images using the internal resource of the spherical camera 110 has been described. Alternatively, the stitching process may be performed on images using an external resource (for example, an external user terminal apparatus such as a PC) different from the internal resource of the spherical camera 110.

When the stitching process is performed in the spherical camera 110, the stitching process is performed using the resource (the CPU 112, a GPU, or the like) of the spherical camera 110, and an image with the stitching process applied is saved as described above. In contrast, when the stitching process is performed outside the spherical camera 110, images (for example, partial images) that have been captured by the image capturing elements 130A and 130B and have not been stitched yet can be saved as respective images or as an image. At this time, optical information during capturing is embedded as metadata in an image or saved as a separate file. Then, the stitching process is performed based on the images (for example, partial images) before stitching and the optical information during capturing using the external resource to generate a stitched image.

When a new image correction technique is developed, in some cases, it is desirable to apply the newly developed image correction technique to a captured image. At this time, when the stitching process has been performed outside the spherical camera 110, since the image data before stitching and the optical information during capturing are held, the new image correction technique can be added in the middle of an existing stitching process that is performed by an external user terminal apparatus.

However, when the stitching process is performed inside the spherical camera 110, a stitched image has been already saved, and in general, it is difficult to apply the image correction technique dependent on the image capturing means, such as the image capturing element or the optical system, merely using the saved stitched image. Even when the stitching process is performed in the external user terminal apparatus, an image before stitching and metadata may be deleted after the stitching process is performed once. Moreover, in some cases, the new image correction technique is not able to be implemented for a captured image using the internal resource of the spherical camera 110, or even through the new image correction technique is able to be implemented, the processing period of time may be insufficient. In particular, it is difficult to implement the new image correction technique in a case where processing per frame is required to be completed within a predetermined period of time, for example, when a moving image is captured. There may be a method of saving both a stitched image and images which have not been stitched; however, the storage capacity may be insufficient particularly in the case of moving images.

Thus, it is desirable to provide a technique capable of posteriorly applying an image correction technique dependent on an image capturing element or an optical systems to a stitched spherical image.

The spherical camera 110 according to the embodiment determines an image capturing element or an optical system used for capturing from the coordinate values of a stitched spherical image and performs image correction based on the determination result. Hereinafter, the image correction process that is performed after the image stitching process according to the embodiment is described in more detail with reference to FIGS. 4, and 12 to 31.

In the embodiment described here, when spherical image (still image or moving image) data after stitching is stored in the image storage 270, image data is associated with information (stitching information) used in the stitching process and is stored so that image correction is posteriorly applicable.

Stitching Information: Stitching information to be stored in the image storage 270 in association with image data according to the embodiment is described with reference to FIG. 12. FIG. 12(A) illustrates a data structure of a stitching table that is stitching information. The stitching table is configured such that the coordinate values of each of pixels constituting a spherical image (equidistant cylindrical projection image) which is an image after stitching is associated with the coordinate values of images before stitching (the above-described partial images 0 and 1) and the stitching position which is the stitching-position detection process result described referring to FIGS. 9 and 10. The images before stitching are captured by the plurality of image capturing means (combinations of the image capturing elements 130A and 130B and the optical systems). Thus, regarding the data structure of the stitching table illustrated in FIG. 12(A), an item of identification information is added as information on an image before stitching for identifying which image capturing element has captured the image (the corresponding optical system is also simultaneously identified). The content of the stitching table corresponds to a combination of the position-detection conversion table 330 and the stitching-position detection result 332 illustrated in FIG. 4.

The data structure illustrated in FIG. 12(A) is merely an example. The data structure is not limited to the data structure in the table corresponding to both images before stitching as illustrated in FIG. 12, and a stitching table may be prepared for each image before stitching. As illustrated in FIG. 12(B), the stitching table is also for allowing coordinate values of images before stitching (fisheye images represented by circles with signs A and B in the drawing) to be referenced from coordinate values of an image after stitching (an equidistant cylindrical projection image represented by a rectangle in the drawing). A method of referring to the coordinate values of the images before stitching is as described with reference to FIG. 7, and the redundant description is omitted.

The stitching table as illustrated in FIG. 12(A) is saved in a manner associated with a spherical image (a still image or a moving image) when captured with the spherical camera 110. For example, in the case of a still image, the stitching table may be recorded using an existing metadata format, such as Exchangeable Image File Format (EXIF) or TIFF. In the case of a moving image, the stitching table may be recorded using an existing container format such as MPEG-4 (MP4) Part 14, or may be recorded by creating a specific metadata format. Alternatively, the stitching table may be recorded as a file different from a file of a still image or a moving image.

In the case of a moving image, it is desirable to record the stitching table per frame. However, regarding information that does not vary depending on the frame (for example, information on an image before stitching), a table value may be held for a moving image, or information on only a portion that varies between frames (a stitching position or a difference) may be held.

In the above description, only the stitching information is stored in association with image data. However, a spherical image with the zenith correction applied may be stored. In such a case, zenith correction data (content corresponding to the inclination detection result 334) may be stored, as information about variations in posture of the plurality of image capturing means, in the image storage 270 in association with image data. The inclination detection result 334 may be also stored as metadata in the image storage 270 in association with image data in a manner similar to the stitching table.

As described above, image data of a spherical image is associated with at least one piece of information selected from the group consisting of a conversion table for generating a spherical image from the plurality of partial images captured by a plurality of image capturing means, information on coordinate conversion (rotation conversion or conversion corresponding to a stitching-position detection result (stitching conversion)) applied to a spherical image, and information on variations in posture of the plurality of image capturing means; and the image data is stored.

As illustrated in FIG. 4, the image processing block 300 according to the embodiment further includes an image-correction processing unit 350 for applying an image correction process to an image after the stitching process. The plurality of image capturing means may have differences in characteristics in relation to either or both of the image capturing elements and the optical systems. Hence, the image-correction processing unit 350 applies image correction dependent on the corresponding image capturing element or optical system to a spherical image after the stitching process, based on the information stored in association with the image data.

The image-correction processing unit 350 illustrated in FIG. 4 more particularly includes an image input unit 352, a coordinate conversion unit 354, a determination unit 356, and an image correction unit 358.

The image-correction processing unit 350 reads a saved spherical image (each frame of a still image or a moving image) from the image storage 270 and inputs the spherical image to the image input unit 352. The image to be input to the image input unit 352 may be a spherical image (combined image) obtained by applying distortion correction to partial images 0 and 1 respectively captured by the image capturing elements 130A and 130B and stitching the corrected partial images 0 and 1 at a stitching position per area. The image-correction processing unit 350 also reads a stitching table and zenith correction data. The stitching table is information about the plurality of image capturing means used for capturing the spherical image. The image-correction processing unit 350 constitutes an image input means and an information reading unit according to the embodiment.

The image correction unit 358 applies image correction to the input spherical image. Although not particularly limited, the image correction may include one or both of coordinate correction and pixel-value correction for pixels constituting the spherical image. The pixel-value correction may include independent correction on each of the pixels constituting the spherical image, and correction dependent on a peripheral pixel of each of the pixels.

The coordinate conversion unit 354 executes coordinate conversion to easily execute coordinate correction as one included in the above-described image correction. The coordinate conversion converts the input spherical image into a form conforming to the state of the stitching table stored in the image storage 270. As described above, in the embodiment described here, the content of the position-detection conversion table 330 indicative of that a partial image 0 covers an upper half portion and a partial image 1 covers a lower half portion, and that an overlapping area and a stitching position are converted to be on the equator serves as table values of the stitching table. Thus, coordinate conversion is performed such that a spherical image generated based on the image-combination conversion table 336 conforms to the state of the position-detection conversion table 330. The coordinate conversion will be described later in detail.

The determination unit 356 determines an image capturing means (hereinafter, referred to as a corresponding capturing means) used for capturing each of a plurality of portions in a spherical image. The determination may be made per pixel constituting the spherical image. The coordinate conversion by the above-described coordinate conversion unit 354 is executed for easier determination on the image capturing means.

The image correction unit 358 applies image correction to a spherical image based on the determination result of the corresponding image capturing means for each of a plurality of portions (for example, pixels). The image correction unit 358 can desirably perform the image correction on the determined corresponding image capturing means based on data prepared in advance. Alternatively, the image correction is performed based on the coordinates of a plurality of portions (for example, pixels) of the above-described spherical image, or the pixel positions in the corresponding image capturing means associated with each of the plurality of portions (for example, pixels) in the stitching table. The coordinates after the coordinate conversion for each portion and the pixel position associated with the portion indicate an optical position in the corresponding image capturing means. The determination result includes a result of identification of the corresponding image capturing means and a result of specification of the optical position in the corresponding image capturing means. The image correction unit 358 constitutes a correction means according to the embodiment.

According to a specific embodiment, coordinate correction as a type of the above-described image correction may be blur correction. In this case, the coordinate correction is performed by a correction amount corresponding to a difference in time of exposure to light within a frame based on the determined corresponding image capturing means and the pixel position (optical position) of a corresponding image before stitching.

According to another specific embodiment, the pixel-value correction as a type of the above-described image correction is light-intensity correction, and is performed by a correction amount corresponding to an image height based on the determined corresponding image capturing means and the coordinates of a corresponding spherical image or the pixel position in an image before stitching.

According to a desirable embodiment, the image correction unit 358 generates a predetermined correction table during the image correction process and applies image correction to a spherical image based on the generated correction table. The image correction unit 358 can output the correction table generated when applying the image correction to the spherical image in association with image data after correction so that another image correction can be posteriorly applied to the image to which the image correction has been applied.

The correction table holds, for the coordinates of an image (spherical image) after correction, the coordinates of an image (spherical image) before correction, a format designation value for designating a format of correction, and a correction amount for correction in the format designated using the format designation value.

Hereinafter, the image correction method using a correction table according the embodiment is described with reference to FIG. 13. FIG. 13(A) illustrates a data structure of a correction table for generating an image after correction from an image before correction. FIG. 13(B) illustrates an image correction method using the correction table. As illustrated in FIG. 13, for coordinate values of an image after correction, with reference to the correction table, coordinate values (v0) of corresponding coordinates are acquired from an image before correction, and values obtained by applying a correction process to the pixel values (v0) serve as pixel values (v1) of an image after correction. In the correction table illustrated in FIG. 13(A), coordinate values of an image before correction and a correction method are set for coordinate values of an image after correction. In this case, the correction method is information required for performing correction calculation on the pixel values of the image before correction.

FIG. 13(C) illustrates a table in which four basic operations of arithmetic as correction modes are associated with designation values for designating the four basic operations of arithmetic. Values "1", "2", "3", and "4" are respectively given to correction modes of "addition", "subtraction", "multiplication", and "division".

Thus, when the four basic operations of arithmetic are set for the correction modes as illustrated in FIG. 13(C), the correction table in FIG. 13(A) describes that, as correction on coordinate values (θa, φa) of an image after correction, pixel values (v0) of coordinate values (θb, φb) of an image before correction are acquired and the pixel values (v0) are corrected using correction mode=1 (addition) and a correction amount (n), that is, $v1=f_1(v0, n)=V0+n$ serves as pixel values of the coordinate values (θa, φa) of the image after correction.

A process flow of a posterior image correction process according to the embodiment is described below with reference to FIGS. 13 to 22. In the following description, an image expressed by an equidistant cylindrical projection method (hereinafter, referred to as equidistant cylindrical projection image) as a spherical image format is used. In the description, a target is a stitched still image or a stitched moving image captured by the spherical camera 110 and saved in the external storage 134 and the process flow according to the embodiment is performed in the spherical camera 110. Alternatively, the process flow may be performed in an apparatus outside the spherical camera 110, such as a user terminal apparatus (described later).

Figure 14:
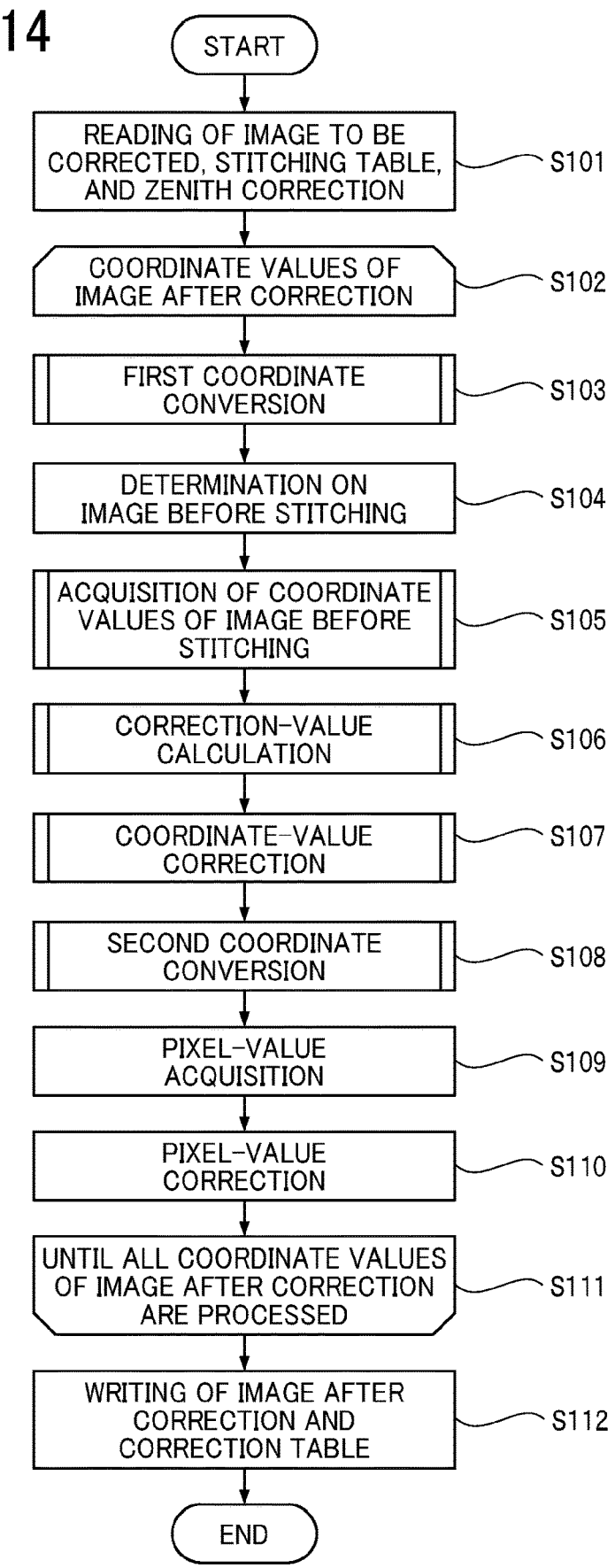
FIG. 14 is a flowchart illustrating a posterior image correction process that is executed by a spherical camera according to the embodiment.

FIG. 14 is a flowchart illustrating the posterior image correction process that is executed using the spherical camera 110 according to the embodiment. The processing illustrated in FIG. 14 starts from step S100 in response to an instruction for application of image correction from an operator. The instruction designates an image to be corrected and the type of image correction.

In step S101, the spherical camera 110 reads an image to be corrected and information (a stitching table and zenith correction data) relating to the plurality of image capturing means used when the image to be corrected is captured, from the image storage 270 using the image input unit 352.

In the loop from step S102 to step S111, processes from step S103 to step S110 are executed for each pixel constituting an image after correction until processes on all pixels are completed. Hereinafter, a pixel of an image after correction of an interest as a target of the processes from step S103 to step S110 is referred to as a pixel to be processed.

In step S103, the spherical camera 110 applies first coordinate conversion to coordinate values of the pixel to be processed using the coordinate conversion unit 354. The first coordinate conversion may include rotation conversion and stitching conversion based on a stitching position per area.

Figure 15B:
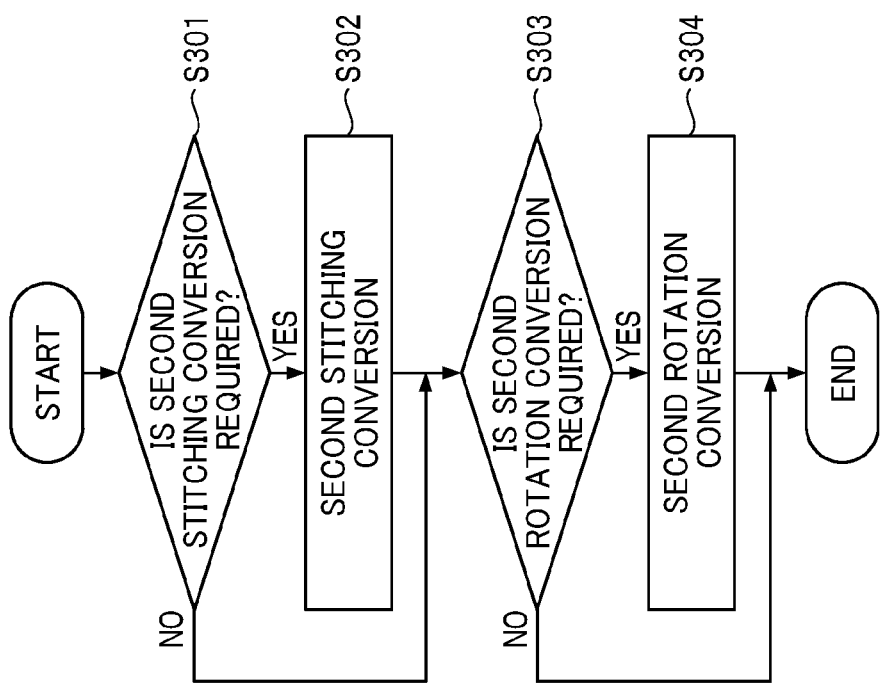
FIG. 15B is a flowchart illustrating a coordinate conversion process that is executed by the spherical camera according to the embodiment.
Figure 15A:
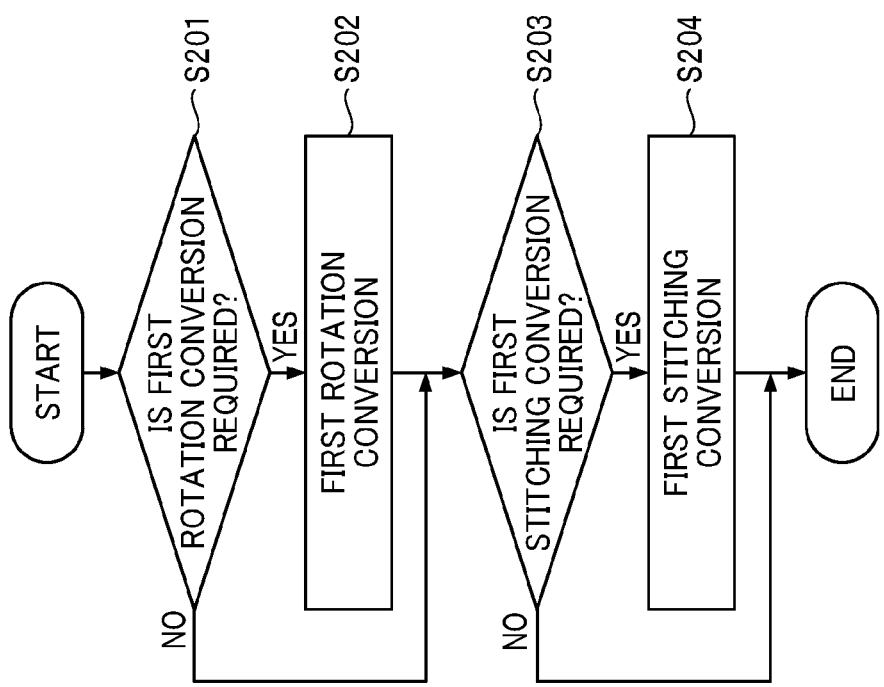
FIG. 15A is a flowchart illustrating a coordinate conversion process that is executed by the spherical camera according to the embodiment.

The first coordinate conversion is described in more detail referring to FIG. 15A, and FIGS. 16 to 18. FIG. 15A is a flowchart illustrating a first coordinate conversion process. The first coordinate conversion illustrated in FIG. 15A starts from step S200 in response to a call in step S103 illustrated in FIG. 14.

In step S201, the spherical camera 110 determines whether first rotation conversion is required. The first rotation conversion is a rotation process for moving a stitching position (overlapping area) of an equidistant cylindrical projection image after stitching onto the equatorial plane in a spherical coordinate system. As described above, the saved equidistant cylindrical projection image has been subjected to rotation conversion to attain the coordinate system illustrated in FIG. 11 or zenith correction that is also rotation conversion for easier viewing by a user, instead of the coordinate system illustrated in FIG. 8. Hence, the stitching position (overlapping area) is at a position other than the equator of the sphere. Thus, the process of the first rotation conversion is required to cancel out the rotation conversion applied to the coordinate system of the input equidistant cylindrical projection image. When it is determined that the first rotation conversion is required in step S201 (YES), the processing branches to step S202, and the spherical camera 110 applies the first rotation conversion to the coordinate values of the pixel to be processed.

The process of the first rotation conversion to be performed in step S202 is described with reference to FIGS. 16 and 17.

Figure 16:
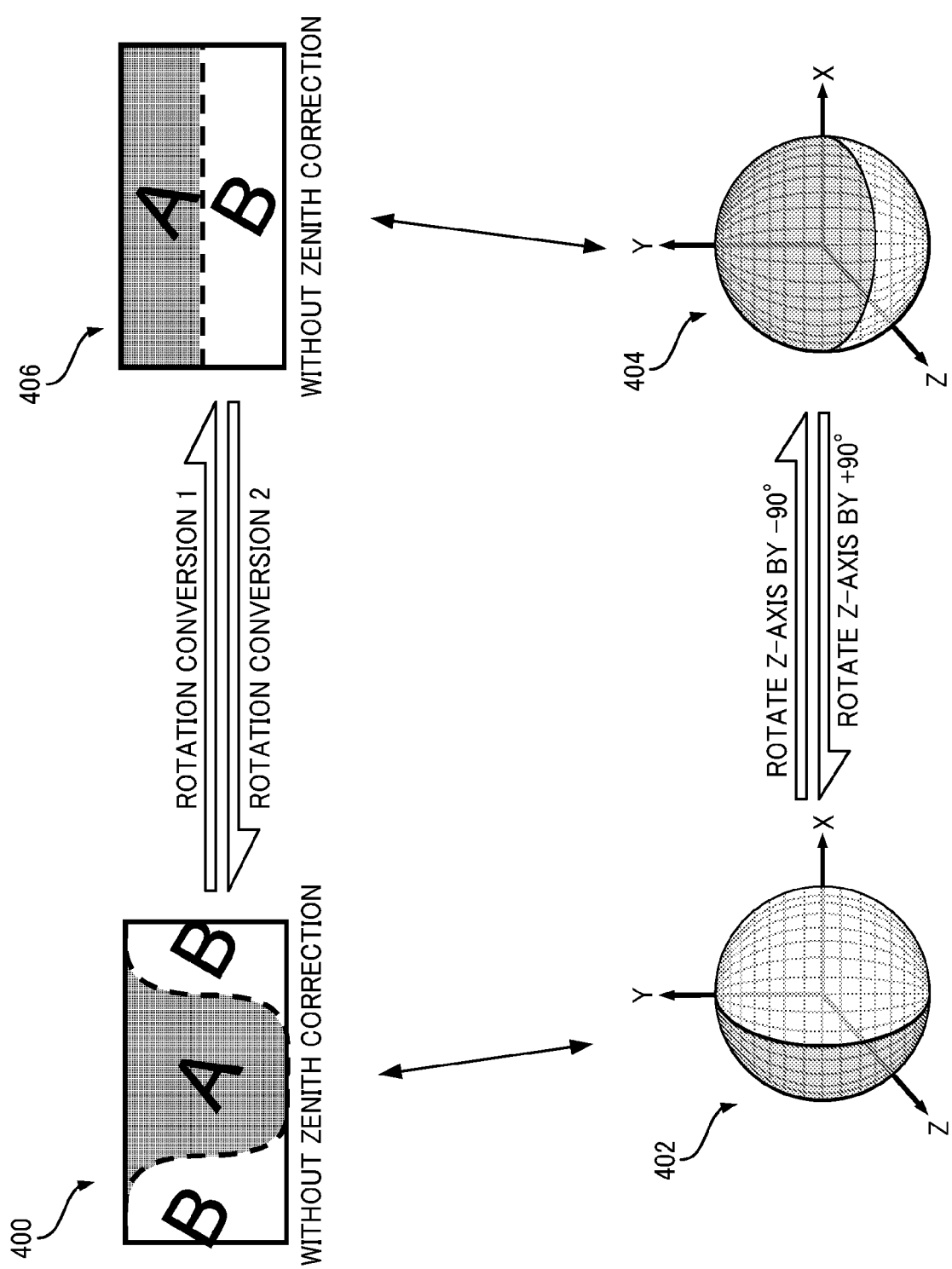
FIG. 16 illustrates rotation conversion that is executed by the spherical camera according to the embodiment when the zenith is not corrected.

FIG. 16 illustrates rotation conversion when the zenith correction has not been applied. Referring to FIG. 16, an image area A (gray) expressed on an equidistant cylindrical projection image indicates an area resulted from the image capturing element 130A (22A), and an image area B (white) indicates an area resulted from the image capturing element 130B (22B). A broken line in FIG. 16 indicates a stitching position when images obtained from the two image capturing elements 130A and 130B are stitched. The processes from step S103 to step S110 are performed per pixel to be processed; however, an image in which the rotation conversion is applied to all pixels may not be generated. FIG. 16 schematically expresses an image that is expected to be obtained when the rotation conversion in step S202 is applied to all pixels. The same applies to other drawings having similar expression.

Referring to FIG. 16, when coordinate values of an equidistant cylindrical projection image 400 in a spherical coordinate system are converted into coordinate values on a sphere 402 in a three-dimensional orthogonal coordinate system, and when the coordinate values are rotated by −90 degrees around the Z-axis in the three-dimensional orthogonal coordinate system, the stitching position moves onto the equatorial plane of a sphere 404. Then, when the coordinate values on the sphere 404 with the rotation conversion applied in the three-dimensional orthogonal coordinate system are converted into the coordinate values in the spherical coordinate system, an equidistant cylindrical projection image 406 is obtained in which an upper half portion of the image serves as an image area A and a lower half portion of the image serves as an image area B, and the center in the vertical direction of the image serves as a stitching position (dotted line).

Figure 17:
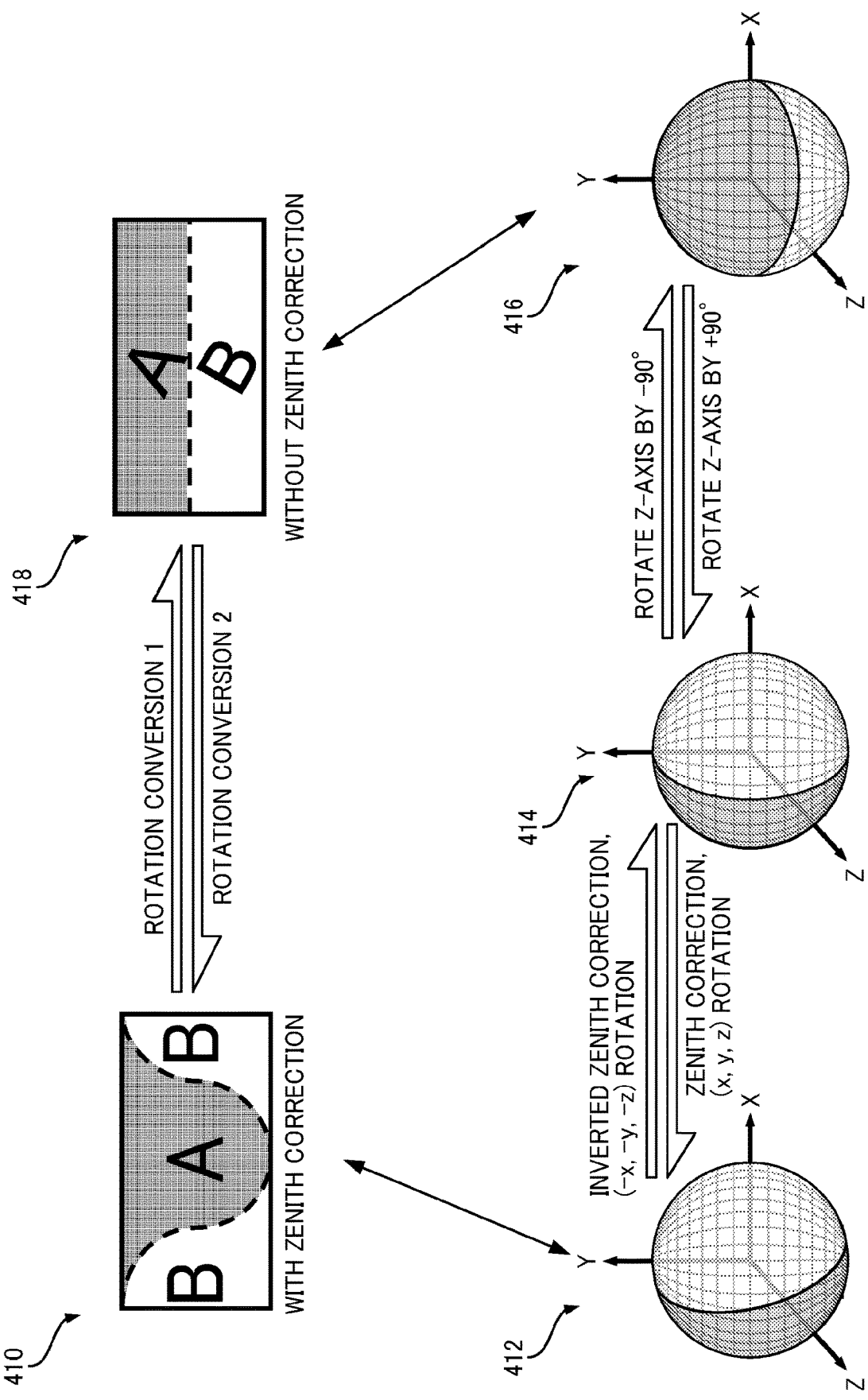
FIG. 17 illustrates rotation conversion that is executed by the spherical camera according to the embodiment when the zenith is corrected.

FIG. 17 illustrates rotation conversion when the zenith correction has been applied. FIG. 17 differs from FIG. 16 in that the zenith correction has been applied to an equidistant cylindrical projection image 410 in FIG. 17. Referring to FIG. 17, like FIG. 16, coordinate values of the equidistant cylindrical projection image 410 in a spherical coordinate system are converted into coordinate values on a sphere 412 in a three-dimensional orthogonal coordinate system. When the zenith correction has been applied to the equidistant cylindrical projection image 410 at an angle of (X, Y, Z)=(x, y, z) for each axis of the three-dimensional orthogonal coordinates, a rotation process of (X, Y, Z)=(−x, −y, −z) is performed to cancel out the zenith correction to provide conversion into coordinate values on a sphere 414 in the three-dimensional orthogonal coordinate system. The subsequent process is similar to the process described with reference to FIG. 16. When the coordinate values on the sphere 414 in the three-dimensional orthogonal coordinate system are rotated by −90 degrees around the Z-axis, the stitching position moves onto the equatorial plane of a sphere 416. When the coordinate values on the sphere 416 with the rotation conversion applied are converted into the coordinate values in the spherical coordinate system, an equidistant cylindrical projection image 418 is obtained in which an upper half portion of the image serves as an image area A and a lower half portion of the image serves as an image area B, and the center in the vertical direction of the image serves as a stitching position (dotted line).

Referring back to FIG. 15 here, in step S203, the spherical camera 110 determines whether first stitching conversion is required. The first stitching conversion represents conversion for correcting coordinate values expanded or contracted for the stitching process when the stitching position of an equidistant cylindrical projection image after stitching is made based on the stitching-position detection result, for example, by the pattern matching process illustrated in FIG. 9.

When it is determined that the first stitching conversion is required in step S203 (YES), in step S204, the spherical camera 110 applies the first stitching conversion to the coordinate values of the pixel to be processed using the coordinate conversion unit 354. In contrast, when an equidistant cylindrical projection image after stitching is obtained by stitching at a uniform subject distance without the stitching detection, it is determined that the first stitching conversion in step S204 is not required, the processing branches to step S205, and the processing is ended.

Figure 18:
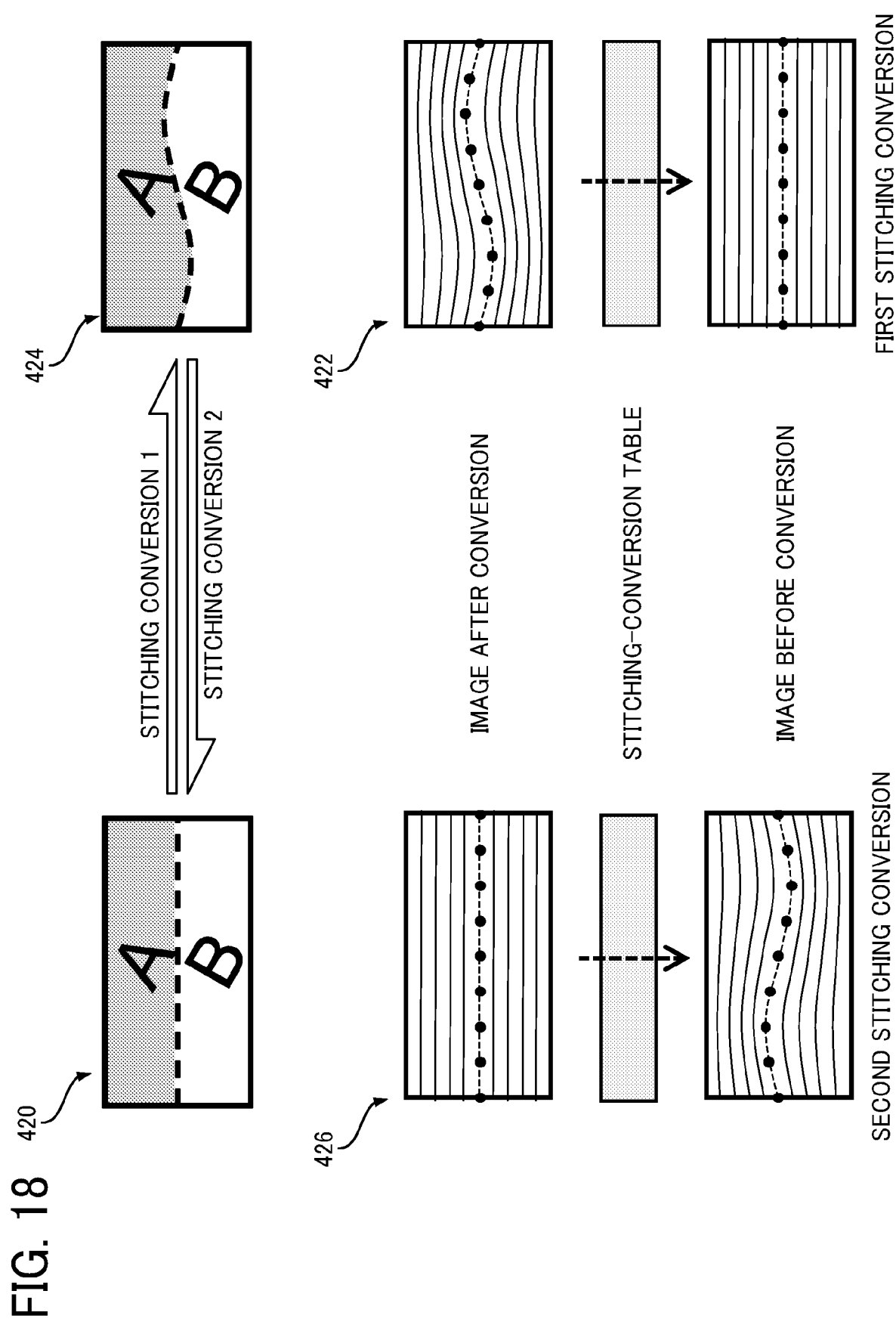
FIG. 18 illustrates stitching conversion that is executed by the spherical camera according to the embodiment.

The first stitching conversion that is executed in step S204 is described with reference to FIG. 18. FIG. 18 illustrates an equidistant cylindrical projection image 420 in a state after the stitching position is moved onto the equatorial plane of the sphere by the first rotation conversion. Since the stitching is provided by the stitching process based on the stitching-position detection result, the subject distances stitched per area differ from one another. The first stitching conversion converts coordinates to change coordinate values expanded or contracted by being stitched at subject distances that differ depending on the area into a state stitched at a uniform subject distance.

The first stitching conversion requires the stitching information used for the stitching process. A process reversal of the image stitching process is performed using the stitching table described referring to FIG. 12. A table in which minus signs are added to the values of the stitching positions in the stitching table illustrated in FIG. 12(A) serves as a table for stitching conversion used by the first stitching conversion in step S204. FIG. 18 also illustrates an image 422 of coordinate conversion of the first stitching conversion. The coordinate values of an image after conversion (corresponding to 424) refer to the coordinate values of an image before conversion (corresponding to 420) from the stitching conversion table. The dotted line portion in the image 422 indicates the stitching position. When coordinate-value conversion equivalent to the state stitched at a uniform subject distance is performed by the first stitching conversion, the stitching position moves to a position deviated from the equatorial plane in the image after conversion (corresponding to 424).

Referring back to FIG. 14, in step S104, the spherical camera 110 determines an image before stitching for the coordinate values of the pixel to be processed using the determination unit 356. More specifically, in step S104, an image before stitching may be determined based on the vertical position of an equidistant cylindrical projection image. When the first stitching conversion (S204) has not been performed, an upper half portion of the equidistant cylindrical projection image is an image area A captured using the image capturing element 130A (22A) and a lower half portion of the equidistant cylindrical projection image is an image area B captured using the image capturing element 130B (22B).

That is, when the coordinates (the coordinate values after the first coordinate conversion is applied) of the image to be processed are located in the upper half portion with respect to vertical coordinates in the equidistant cylindrical projection image (less than 90 degrees), it is determined that the image is an image before stitching captured using the image capturing element 130A (22A). In contrast, when the coordinates are located in the lower half portion (less than or equal to 90 degrees), it is determined that the image is an image before stitching captured using the image capturing element 130B (22B). The determination on an image before stitching is equivalent to determination on a corresponding image capturing means used for capturing a portion of the pixel to be processed, that is, determination on a corresponding image capturing means resulted from the pixel to be processed.

Figure 19:
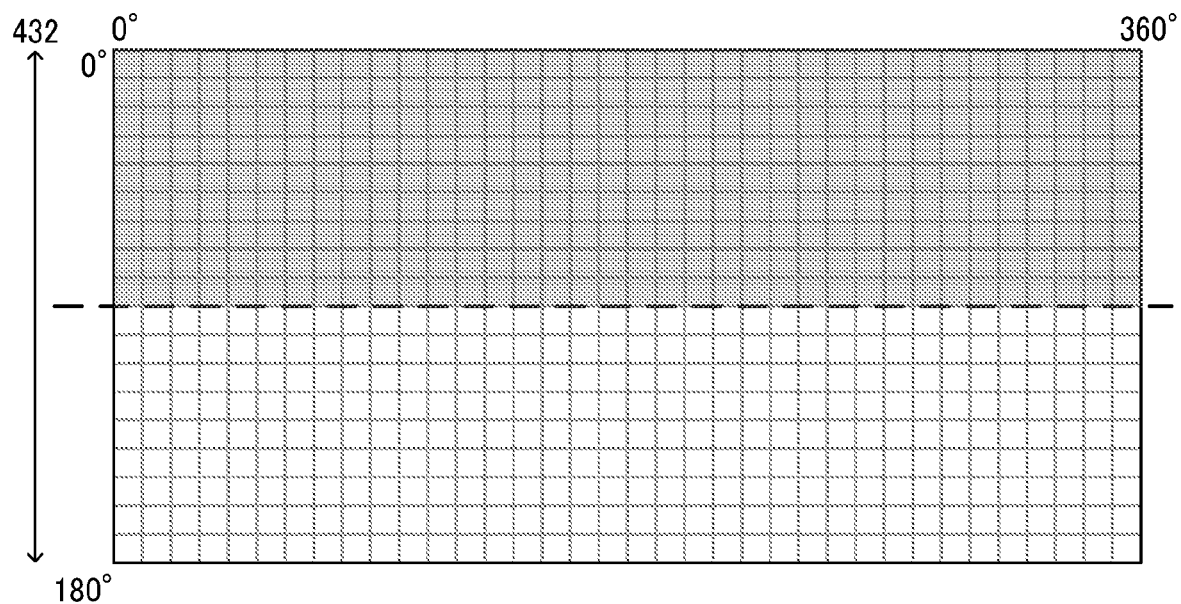
FIG. 19 illustrates a determination process on an image before stitching, the determination process being executed by the spherical camera according to the embodiment.
Figure 19:
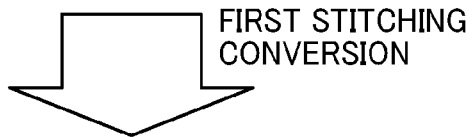
Figure 19:
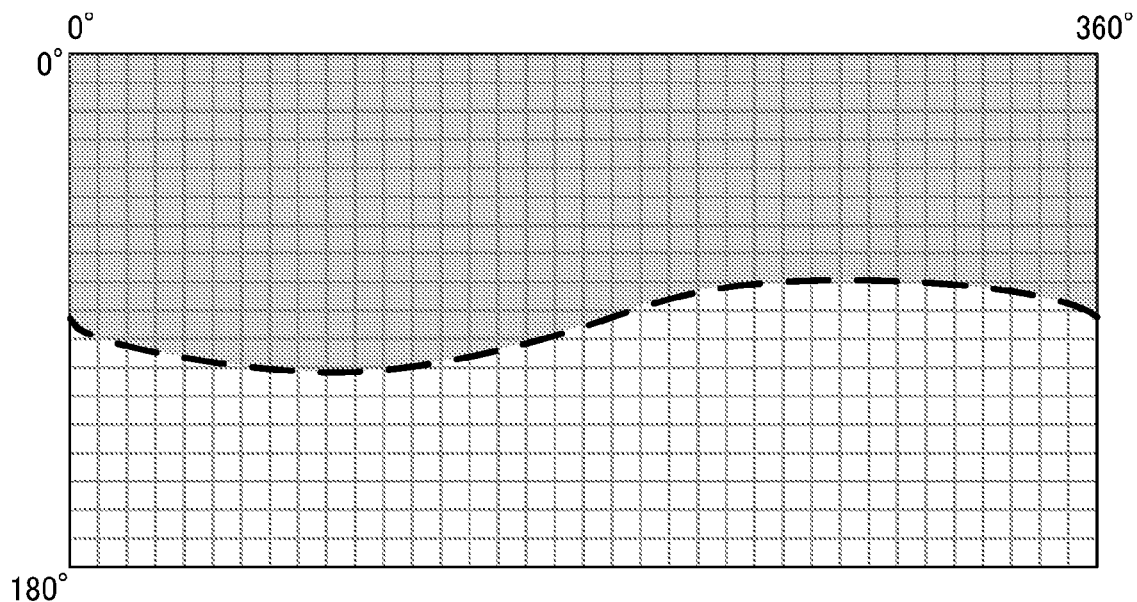

In contrast, when the first stitching conversion (S204) is performed, for example, determination can be made using vertical coordinates 432 of the coordinates in a stage 430 that is after the first rotation conversion (S202) is performed and that is before the first stitching conversion (S204) is performed as illustrated in FIG. 19. That is, the determination on an image before stitching (corresponding image capturing means) can be made based the coordinates obtained by application of the rotation conversion in the first coordinate conversion.

Referring back to FIG. 14, in step S105, the spherical camera 110 acquires coordinate values in the image before stitching for the coordinate values of the pixel to be processed. The process of acquiring the coordinate values of the image before stitching, which is performed in step S105, is described with reference to FIG. 20.

Figure 20A:
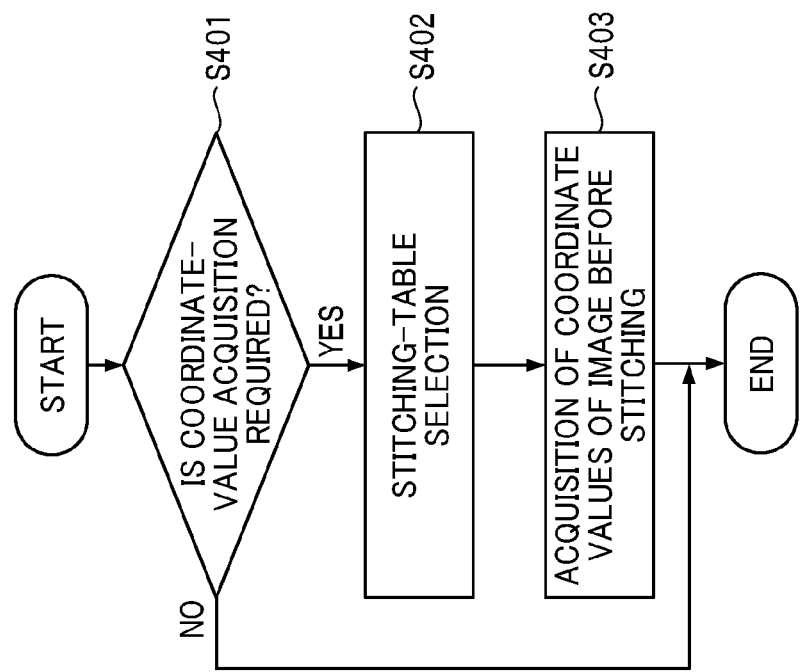
FIGS. 20A and 20B (FIG. 20) illustrate an acquisition process of coordinate values of an image before stitching, the acquisition process being executed by the spherical camera according to the embodiment.

FIG. 20(A) is a flowchart indicating a process of acquiring the coordinate values of the image before stitching. The processing illustrated in FIG. 20(A) starts from step S400 in response to a call in step S105 illustrated in FIG. 14. In step S401, the spherical camera 110 determines whether it is required to acquire the coordinate values of the image before stitching. A correction process can be executed without the coordinate values of the image before stitching depending on the type of correction process. Thus, it is determined that the coordinate values of the image before stitching are required when the type of requested correction corresponds to a process of a predetermined type that requires the coordinate values of the image before stitching. It is desirable that the requirement of the coordinate values of the image before stitching are held per type of correction process and is switchable depending on the type of correction process to be executed.

In step S401, when it is determined that it is required to acquire the coordinate values of the image before stitching (YES), the processing branches to step S402. In step S402, the spherical camera 110 selects a stitching table. More specifically, the spherical camera 110 selects a stitching table corresponding to the image before stitching determined by the determination on an image before stitching (S104). As illustrated in FIG. 12(A), when only one stitching table is prepared for an equidistant cylindrical projection image, the selection of the stitching table in step S402 may be omitted.

Figure 20B:
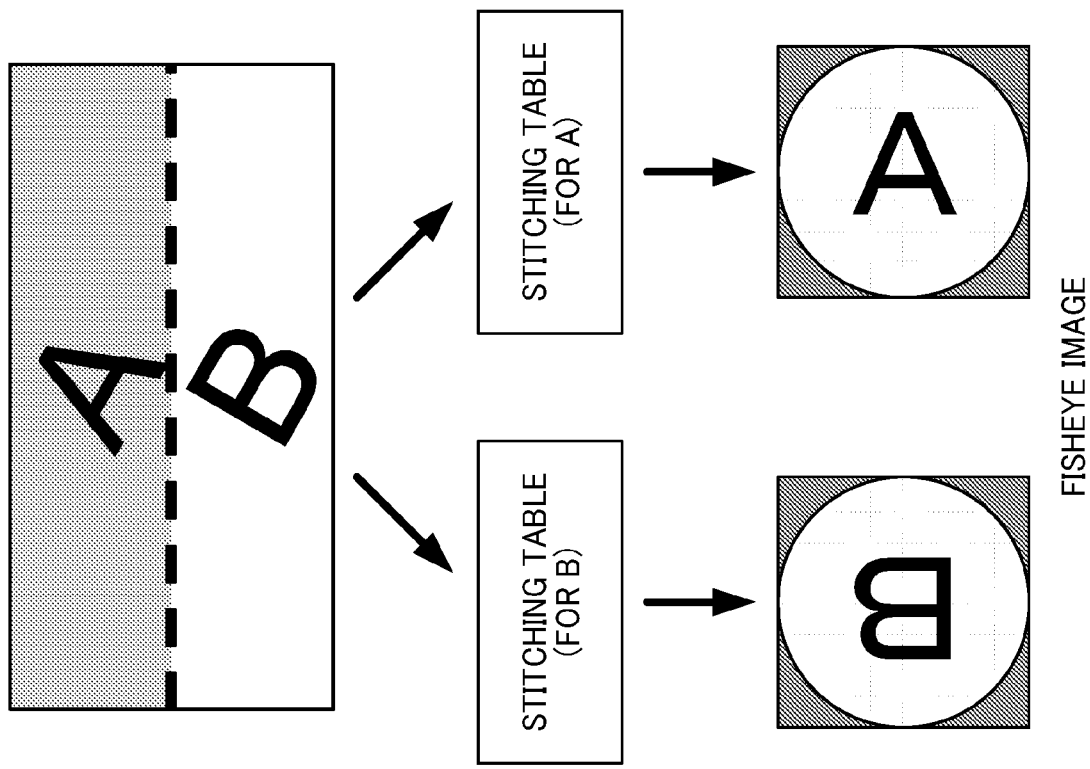

In step S403, the spherical camera 110 acquires coordinate values (x, y) of an image before stitching corresponding to the coordinates of the pixel to be processed (coordinates after the coordinate conversion is applied) with reference to the selected stitching table, and ends the processing in step S404 as illustrated in FIG. 20(B). In contrast, when it is determined that it is not required to acquire the coordinate values of the image before stitching (NO) in step S401, the processing directly branches to step S404.

Referring back to FIG. 14 here, in step S106, the spherical camera 110 calculates correction values for the pixel to be processed using the image correction unit 358. In step S106, values for setting one or both of the coordinate values of the image before correction and the correction method (the correction mode and the correction amount) in the correction table illustrated in FIG. 13(A) are calculated. The coordinate values of the image before correction and the correction method are determined in accordance with the corresponding image capturing means determined for the pixel to be processed. The correction-value calculation is described later in detail using a specific example. Hence, the description is continued here based on an assumption that correction values are calculated and that the values are set in one or both of the coordinate values of the image before correction and the correction method in the correction table.

Figure 21A:
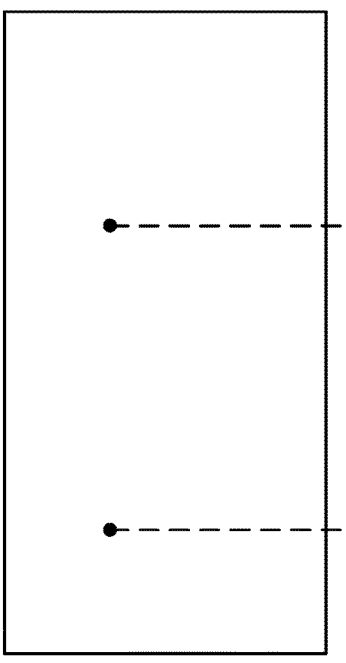
FIGS. 21A and 21B (FIG. 21) illustrate a coordinate-value correction process that is executed by the spherical camera according to the embodiment.
Figure 21A:
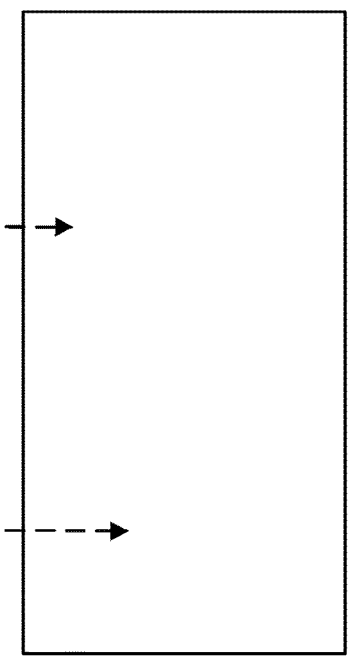
Figure 21B:
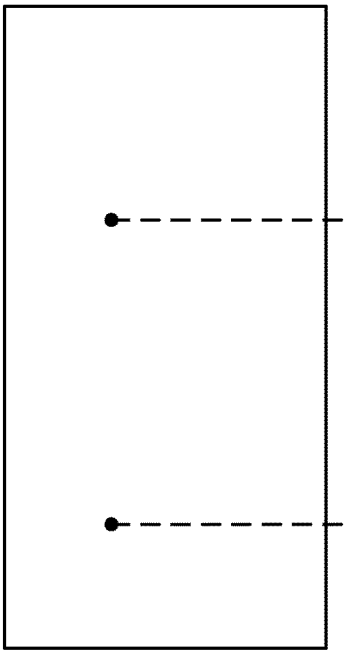
Figure 21B:
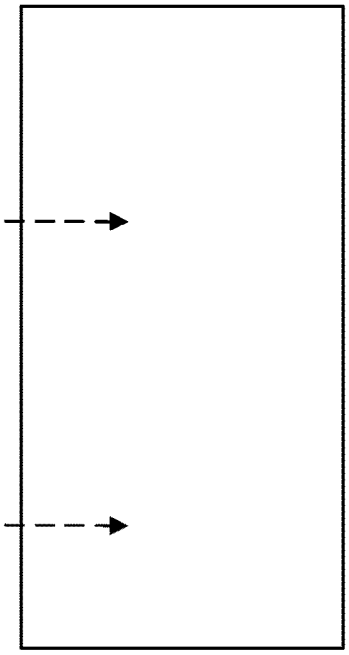

In step S107, the spherical camera 110 applies the coordinate-value correction using the image correction unit 358. The process of the coordinate-value correction executed in step S107 illustrated in FIG. 14 is described below with reference to FIG. 21. The coordinate-value correction that is executed in step S107 is performed by referring to the coordinate values of the image before correction in the correction table set by the coordinate-value calculation in step S106. In the case without the coordinate-value correction, the image after correction and the image before correction have the same coordinate values as illustrated in FIG. 21(A). In contrast, in the case with the coordinate-value correction, the image after correction and the image before correction have different coordinate values as illustrated in FIG. 21(B). Since the determination is based on the coordinate values of the reference destination in the image before correction of the correction table, there is a case with the coordinate correction and a case without the coordinate correction.

In step S108, the spherical camera 110 applies second coordinate conversion to the coordinate values (coordinate values after application of the coordinate-value correction in step S107) of the pixel to be processed using the coordinate conversion unit 354. Although the second coordinate conversion may include the rotation conversion and the stitching conversion based on the stitching position per area, the second coordinate conversion is conversion reversal of the first coordinate conversion executed in step S103.

The second coordinate conversion is described in more detail referring to FIG. 15B, and FIGS. 16 to 18. FIG. 15B is a flowchart illustrating a second coordinate conversion process. The second coordinate conversion illustrated in FIG. 15B starts from step S300 in response to a call in step S108 illustrated in FIG. 14.

In step S301, the spherical camera 110 determines whether the second stitching conversion is required. When the result detected by the pattern matching process or the like illustrated in FIG. 8 is used as a stitching position, since the first stitching conversion has been performed by the first coordinate conversion in step S103, the second stitching conversion is required to restore the first stitching conversion. In contrast, when the stitching-position detection result has not been used and the stitching process has been performed at a uniform subject distance, the first stitching conversion has not been performed by the first coordinate conversion in step S103, and the second stitching conversion is not required.

In step S301, when it is determined that the second stitching conversion is required in step S301 (YES), the processing branches to step S302, and the spherical camera 110 applies the second rotation conversion to the coordinates of the pixel to be processed. In contrast, when the stitching detection has not been performed and the stitching has been performed at a uniform subject distance, it is determined that the second stitching conversion in step S302 is not required, and the processing directly branches to step S303.

The process of the second stitching conversion is described with reference to FIG. 18. Referring to FIG. 18, the equidistant cylindrical projection image 424 is in a state on which coordinate-value conversion equivalent to the state stitched at a uniform subject distance by the first stitching conversion has been performed. The second stitching conversion uses the stitching table described with reference to FIG. 12 to convert the stitching position into the position based on the stitching-position detection result. The second stitching conversion uses the stitching position in the stitching table to perform a process equivalent to the stitching process. A table having the values of the stitching position without a change in the stitching table in FIG. 12 serves as a stitching-conversion table that is used for the second stitching conversion.

FIG. 18 also illustrates an image 426 of coordinate-value conversion of the second stitching conversion. For an image after conversion (corresponding to 420), coordinate values of an image before conversion (corresponding to 424) are acquired with reference to the stitching-conversion table. The dotted line portion in FIG. 18 indicates a stitching position. When the coordinate-value conversion with the stitching-position detection result reflected is performed by the second stitching conversion, the stitching position of the image after conversion (corresponding to 420) moves onto the equatorial plane.

Referring back to FIG. 15B, in step S303, the spherical camera 110 determines whether the second rotation conversion is required. It is determined whether the second rotation conversion from the state in which the stitching position of the equidistant cylindrical projection image after stitching is on the equatorial plane of the sphere is required. As described above, the equidistant cylindrical projection image has been subjected to the rotation conversion to attain the coordinate system illustrated in FIG. 11 or the zenith correction that is also rotation conversion for easier viewing by a user. Hence, the stitching position is not on the equatorial plane of the spherical coordinates. In this case, since the first rotation conversion has been performed by the first coordinate conversion in step S103, in step S303, the second rotation conversion is required to restore the first rotation conversion. When it is determined that the second rotation conversion is required in step S303 (YES), the processing branches to step S304, and the spherical camera 110 applies the second rotation conversion to the coordinate values of the pixel to be processed.

Referring back to FIGS. 16 and 17, the process of the second rotation conversion that is performed in step S304 is described.

FIG. 16 illustrates the second rotation conversion when the zenith correction has not been applied. When the coordinate values of the equidistant cylindrical projection image 406 in the spherical coordinate system are converted into the coordinate values on the sphere 404 in the three-dimensional orthogonal coordinate system, and when the sphere 404 is rotated by +90 degrees around the Z-axis in the three-dimensional orthogonal coordinate system, the stitching position moves in the longitudinal direction of the sphere 402. When the coordinate values on the sphere 402 with the rotation conversion applied in the three-dimensional orthogonal coordinate system are converted into the coordinate values in the spherical coordinate system, an equidistant cylindrical projection image 400 to which the zenith correction has not been applied is obtained.

FIG. 17 illustrates the second rotation conversion to which the zenith correction has been applied. FIG. 17 differs from FIG. 16 in that the zenith correction has been applied in FIG. 17. Referring to FIG. 17, when the coordinate values of the equidistant cylindrical projection image 418 in the spherical coordinate system are converted into the coordinate values on the sphere 414 in the three-dimensional coordinate system, the conversion is similar to that in the case where the zenith correction has not been applied as illustrated in FIG. 16. Then, the rotation of the zenith correction is applied at an angle of (X, Y, Z)=(x, y, z) to each axis from the sphere 414 in the three-dimensional orthogonal coordinate system to perform conversion into the coordinate values of the sphere 412 in the three-dimensional orthogonal coordinate system and further to perform conversion into the coordinate values in the spherical coordinate system. Accordingly, an equidistant cylindrical projection image 410 with the zenith correction applied is obtained.

As described above, in step S304, the coordinate correction is applied to the coordinate values of the pixel to be processed, and then the inverted second rotation conversion is performed for restoring to the state of the input spherical image.

Referring back to FIG. 14, in step S109, the spherical camera 110 acquires pixel values of the image before correction for the coordinate values of the pixel to be processed using the image correction unit 358 with reference to the correction table illustrated in FIG. 13(A). In step S110, the spherical camera 110 applies correction by a predetermined correction amount in a designated correction mode to the acquired pixel values for the coordinate values of the pixel to be processed. The basic processes for pixel-value acquisition and pixel-value correction in step S109 and step S110 have been described with reference to FIG. 13, and hence the description is omitted here.

Described here referring to FIG. 22 is a case where two types of image correction are performed as practical processes of pixel-value acquisition and pixel-value correction.

Figure 22B:
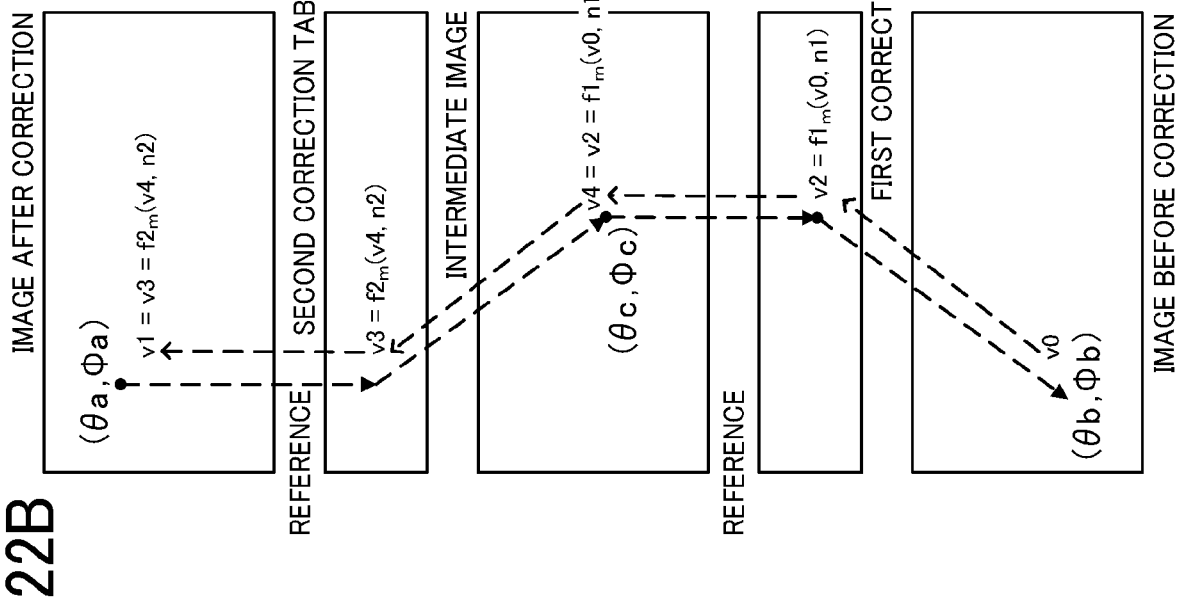
FIGS. 22A and 22B (FIG. 22) illustrate practical processes of pixel-value acquisition and pixel-value correction that are executed by the spherical camera according to the embodiment.
Figure 22A:
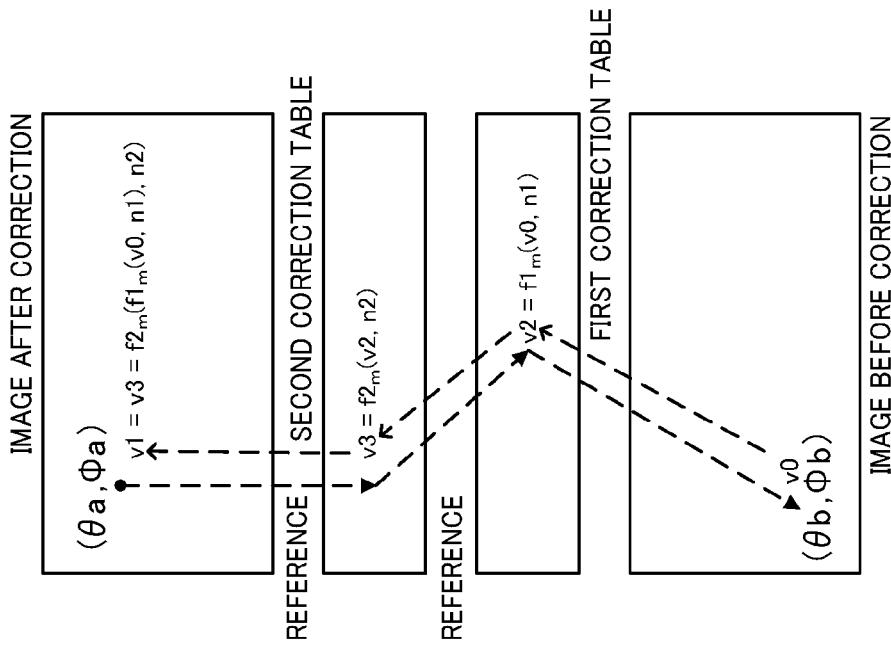

FIG. 22(A) illustrates pixel-value acquisition and pixel-value correction of an image before correction when two correction tables are used. The correction tables include a first correction table and a second correction table each having a format similar to the format illustrated in FIG. 13(A). The coordinate values of an image after correction in the first correction table correspond to the coordinate values of an image before correction in the second correction table.

When the pixel-value correction is not performed, pixel values (v1) of the pixel to be processed of the image after correction become pixel values (v0) obtained with reference to the correction table in the order of the second correction table and the first correction table for the coordinate values ($\theta a$, $\varphi a$) of the pixels to be processed of the image after correction to obtain the coordinate values ($\theta b$, $\varphi b$) of the image before correction, and acquired from the coordinate values of the image before correction.

When the pixel-value correction is performed, correction by the correction method in the first correction table is performed on the pixel values (v0) acquired from the image before correction to obtain pixel values (v2=f1$_m$(v0, n1), where f1$_m$( ) represents a correction function in a correction mode (m) in the first correction table, and n1 represents a correction amount given by the first correction table). Furthermore, correction by the correction method in the second correction table is performed on the acquired pixel values (v2) to obtain pixel values (v3=f2$_m$(v2, n2), where f2$_m$( ) represents a correction function in a correction mode (m) in the second correction table, and n2 represents a correction amount given by the second correction table). The pixel values (v2) become pixel values (v1) of the pixel to be processed of the image after correction. FIG. 22(A) corresponds to a case where, when the image correction includes the first image correction and the second image correction, the first image correction and the second image correction are applied in a directly superimposed manner.

In contrast, FIG. 22(B) illustrates pixel-value acquisition and pixel-value correction of an image before correction when two correction tables are used likewise and an intermediate image is generated in the middle. In this case, a process of creating an intermediate image is executed. The method is basically similar to the method described referring to FIG. 13(B). The coordinate values (θb, φb) of the image before correction are acquired for coordinate values (θc, φc) of the pixel to be processed of the intermediate image with reference to the first correction table, and the pixel values (v0) are acquired from the coordinate values of the image before correction. The acquired pixel values (v0) are corrected by the correction method in the first correction table to obtain pixel values (v2=f1$_m$(v0, n1)) to serve as pixel values (v4) of the intermediate image. In this case, the process based on the first correction table is performed on all pixels of the intermediate image and an intermediate image is created once.

Then, the image after correction is created likewise. For the pixel to be processed of the image after correction, corresponding coordinate values (θc, φc) of the intermediate image are acquired from coordinate values (θa, φa) of the pixel to be processed of the image after correction with reference to the second correction table, and pixel values (v4) of the acquired coordinate values are acquired from the intermediate image. The pixel values (v4) are corrected by the correction method in the second correction table to obtain pixel values (v3=f2$_m$(v4, n2)), and the obtained pixel values serve as pixel values (v1) of the pixel to be processed of the image after correction. FIG. 22(B) corresponds to a case where, when the image correction includes the first image correction and the second image correction, the second image correction is applied to the intermediate image obtained by applying the first image correction.

In the above description, the correction table refers to a pixel value of the reference destination. Alternatively, image correction can be performed using a pixel near the pixel to be processed. The method of creating the intermediate image illustrated in FIG. 22(B) is effective when image correction is performed also using such a pixel near the pixel to be processed, and can be desirably used when a plurality of types of image correction are applied and when the result of the previous correction process on the pixel near the pixel to be processed is required. In contrast, the method of not creating the intermediate image in FIG. 22(A) can be desirably used when it is sufficient to simply calculate the pixel to be processed.

Referring back to FIG. 14, when the processing on all pixels to be processed is completed and the processing exits the loop from step S102 to step S111, in step S112, the spherical camera 110 writes out the image after correction and the correction table to the image storage 270 or the like, and the processing is ended in step S113.

The correction-value calculation in step S106 illustrated in FIG. 14 is described below in more detail using two specific examples referring to FIGS. 23, 24, and 25 to 27.

Figure 23:
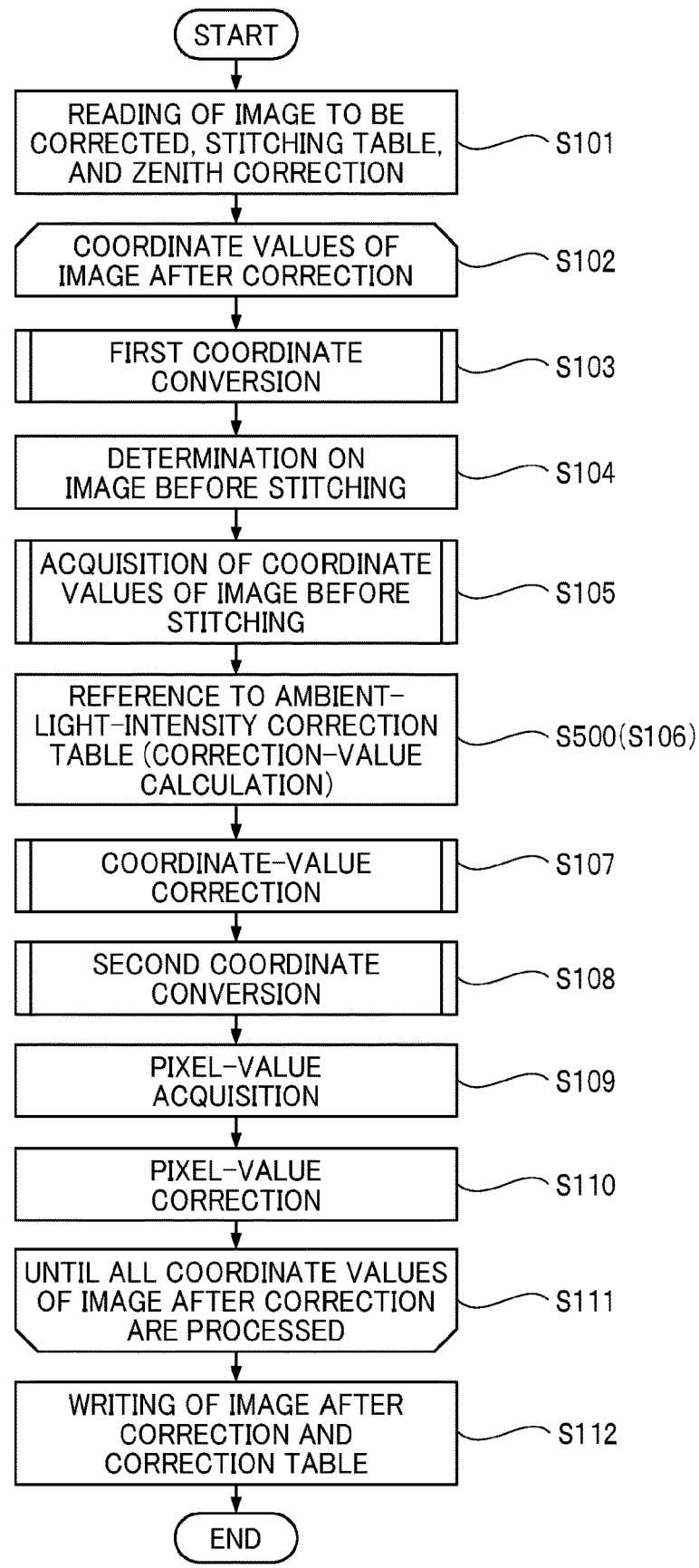
FIG. 23 is a flowchart illustrating a posterior ambient-light-intensity correction process that is executed by the spherical camera according to the embodiment.
Figure 24A:
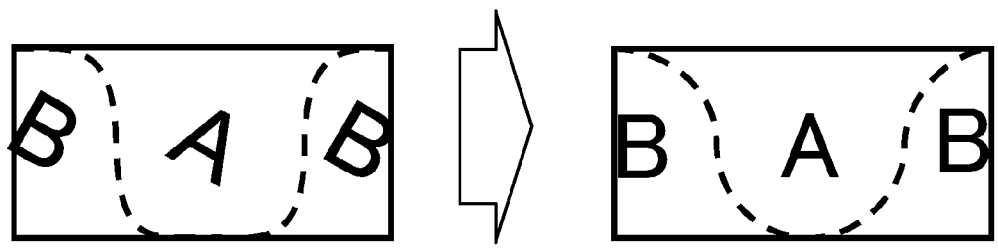
FIGS. 24A to 24E (FIG. 24) illustrate a process when image correction is ambient-light-intensity correction according to a specific embodiment.

Case of Ambient-light-intensity Correction: A first specific example is a case where the image correction is ambient-light-intensity correction. Posterior ambient-light-intensity correction is described with reference to FIGS. 23 and 24. FIG. 23 is a flowchart illustrating a posterior ambient-light-intensity correction process. FIG. 24(A) illustrates equidistant cylindrical projection images before and after correction. The image before correction is an image without zenith correction. The image after correction is an image on which ambient-light-intensity correction and zenith correction have been performed. A basic portion of FIG. 23 is common to the flowchart illustrated in FIG. 14, and hence new steps are mainly described.

In step S500 illustrated in FIG. 23, the spherical camera 110 refers to an ambient-light-intensity correction table and calculates a correction value. Step S500 corresponds to the correction-value calculation process in step S106 illustrated in FIG. 14.

Figure 24B:
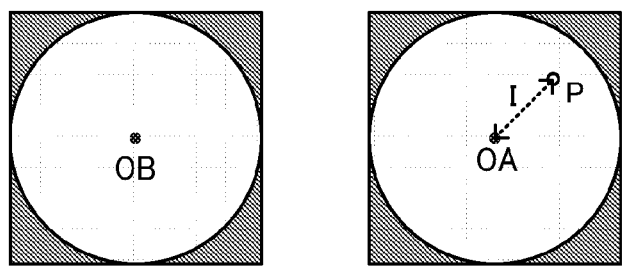

The ambient-light-intensity correction table is described with reference to FIG. 24. FIG. 24(B) illustrates partial images obtained by two fisheye lenses (20A, 20B). A point OA and a point OB in the partial images represent coordinate values corresponding to the optical-axis centers of the corresponding fisheye lenses.

Figure 24C:
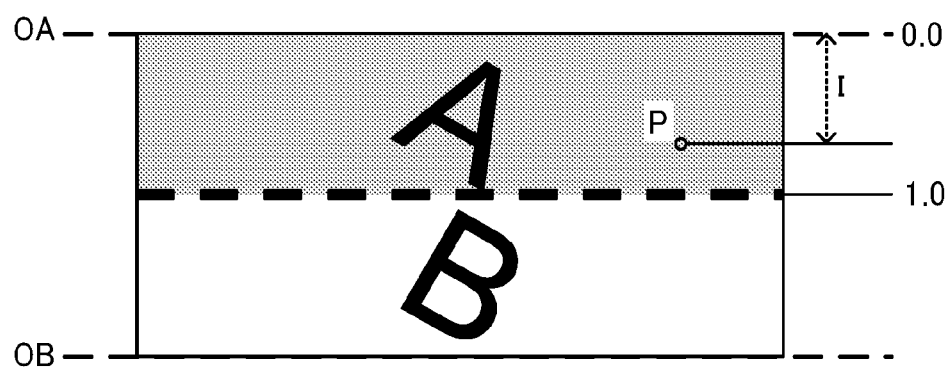

In this case, the ambient-light-intensity correction at the position of the point P on one of fisheye images is described. Typically, a drop in ambient light intensity at the point P is generated depending on a distance l from the optical-axis center OA of the lens to the point P (hereinafter, referred to as image height). FIG. 24(C) illustrates an image after the first coordinate conversion is applied to an equidistant cylindrical projection image before correction. In the equidistant cylindrical projection image illustrated in FIG. 24(C), the upper end thereof is at a position corresponding to the optical-axis center OA of the fisheye lens (20A), and the lower end thereof is at a position corresponding to the optical-axis center OB of the fisheye lens (20B). In FIG. 24, a point P belongs to an image area A, and has an image height corresponding to a distance (l) from the upper end of the image to the point P. If the point P belongs to an image area B, the distance from the lower end of the image corresponds to the image height.

Figures 24D, 24E:
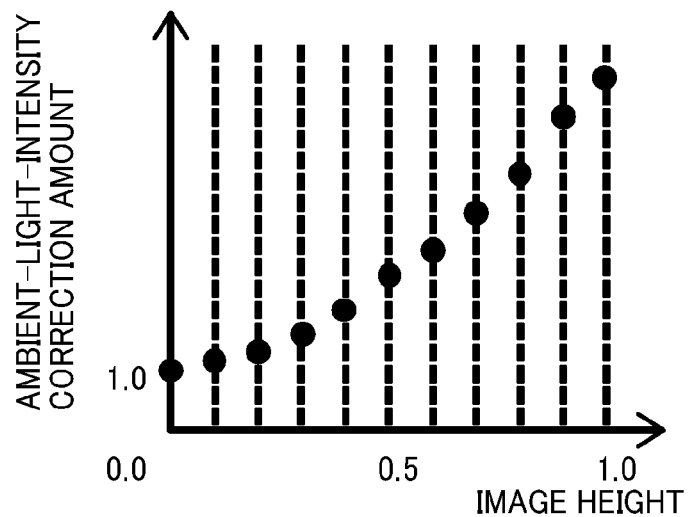

FIG. 24(D) illustrates the relationship between the image height of the lens and the ambient-light-intensity correction amount. FIG. 24(E) is a table expressing the relationship between the image height of the lens and the ambient-light-intensity correction amount illustrated in FIG. 24(D). As the image height increases, the drop in ambient light intensity increases, and hence the ambient-light-intensity correction amount increases. The ambient-light-intensity correction amount is a gain value by which a pixel value before correction is multiplied. An ambient-light-intensity correction amount is set for each image height, and a set of such values serves as an ambient-light-intensity correction table as illustrated in FIG. 24(E). Since the optical systems have difference characteristics, the ambient-light-intensity correction amount is set for each fisheye lens (image capturing element).

The process of the ambient-light-intensity correction is described below in more detail with reference to FIG. 23. As illustrated in FIG. 23, the process is performed per pixel to be processed. In step S103, the first coordinate conversion is performed to change coordinate arrangement for easier determination on an image before stitching using an image before correction. In step S104, determination on an image before stitching is performed to determine an image before stitching (corresponding image capturing means) to which a pixel to be processed belongs.

In the ambient-light-intensity correction, it is not required to acquire the coordinate values of the image before stitching in step S105. Thus, requirement information indicative of that it is not required to acquire the coordinate values of the image before stitching is held in advance in accordance with the type of ambient-light-intensity correction. When the ambient-light-intensity correction is selected, the information is acquired to bypass the process in steps S402 and S403 on the determination whether the coordinate values are acquired (S401) in the process of acquiring the coordinate values of the image before stitching in step S105. In the embodiment described here, since it is not required to acquire the coordinate values of the image before stitching because the image height is obtained as the distance l on the equidistant cylindrical projection image. However, the coordinate values of the image before stitching corresponding to the pixel to be processed may be acquired, and the distance to the optical-axis center of the image before correction may be calculated using the coordinate values of the image before stitching to obtain the image height. When correction using the image height and the pixel position is performed, the coordinate values of the image before stitching are acquired.

When the ambient-light-intensity correction table in step S500 is referenced, the ambient-light-intensity correction table for the image before stitching, which has been determined in the determination on the image before stitching in step S103, is referenced, the ambient-light-intensity correction amount (correction value) is acquired in accordance with the image height corresponding to the coordinates of the pixel to be processed, and the correction mode and the correction amount are set for the correction method in the correction table illustrated in FIG. 13(A). For the correction mode, "3" indicative of multiplication is set. Moreover, the same values as the coordinate values of the image after correction are set for the coordinate values of the image before correction in the correction table. As described above, the correction is performed with the correction amount corresponding to the image height based on the determined corresponding image capturing means, and the coordinates on the equidistant cylindrical projection image or the pixel position of the image before stitching.

The coordinate-value correction in step S106 acquires the coordinate values of the image before correction corresponding to the coordinate values of the pixel to be processed with reference to the correction table. The ambient-light-intensity correction sets the same values for the coordinate values of the image before correction and the coordinate values of the image after correction in the correction table as described above. Thus, the coordinate-value correction is not performed. In the case of the ambient-light-intensity correction, step S106 can be omitted.

The second coordinate conversion in step S108 restores the state rotated by the first coordinate conversion in step S103 and performs the rotation process of the zenith correction using saved zenith correction data. As described above, an image before correction is an image without the zenith correction and an image after correction is an image on which the ambient-light-intensity correction and the zenith correction have been performed. In this case, the first coordinate conversion and the second coordinate conversion are not strictly inverted conversions.

In step S108, the pixel values are acquired from the coordinates in the image before correction, and the pixel values are corrected according to the correction method in the correction table set in step S500. In the case of the ambient-light-intensity correction, "3" indicative of multiplication is set to the correction method in the correction table. Hence, the ambient-light-intensity correction is applied by multiplying the pixel values acquired in step S108 by the correction amount.

Figure 25:
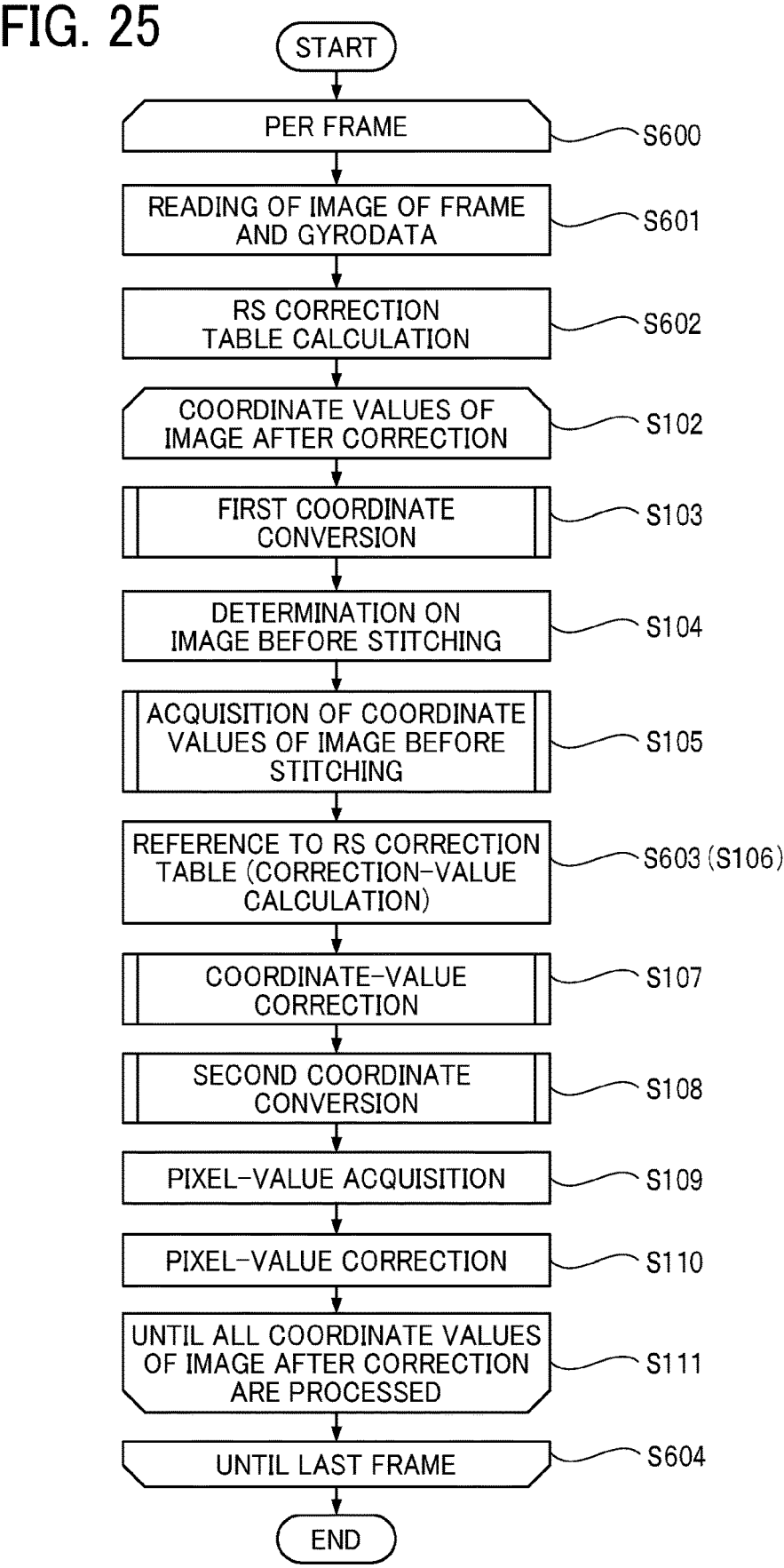
FIG. 25 is a flowchart illustrating a posterior blur correction process that is executed by the spherical camera according to the embodiment.
Figure 26A:
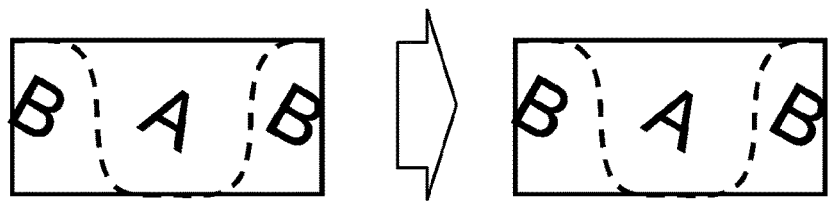
FIGS. 26A to 26D (FIG. 26) illustrate influence of a rolling shutter in blur correction.

Case of Blur Correction Regarding Rolling Shutter: A second specific example is a case where the image correction is blur correction regarding a rolling shutter. Posterior blur correction regarding the rolling shutter is described with reference to FIGS. 25 to 27. FIG. 25 is a flowchart illustrating the posterior blur correction process regarding the rolling shutter. FIG. 26(A) illustrates equidistant cylindrical projection images before and after correction. The image before correction is an image without the zenith correction. The image after correction is an image on which only the blur correction is performed but the zenith correction is not performed. A basic portion of FIG. 25 is common to the flowchart illustrated in FIG. 14, and hence new steps are mainly described.

The processing illustrated in FIG. 25 is processing for a moving image. In the loop from step S600 to step S604, processes inside the loop are executed per frame to the last frame. In step S601, the spherical camera 110 acquires an image of a current frame to be processed as an image to be processed, and acquires gyrodata corresponding to the section of the frame. Gyrodata is given as metadata or the like to image data. In this case, it is assumed that data corresponding to a frame to be processed is acquired.

Figure 26B:
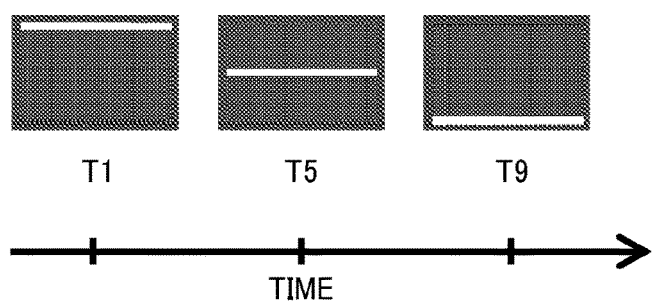

In step S602, the spherical camera 110 calculates a rolling shutter (hereinafter, abbreviated as RS) correction table. An RS correction table calculation process in step S602 is described referring to FIGS. 26 and 27. An overview of the blur correction regarding the rolling shutter is described referring to FIG. 26. FIG. 26(B) illustrates an operating state of the rolling shutter. Typical image capturing elements 130A and 130B each read data while scanning pixel values per line from the upper end of an image to the lower end of the image. When T1 denotes a time at which the upper end of the image is read by one of the image capturing elements 130A and 130B. T5 denotes a time at which the middle of the image is read, and T9 is a time at which the lower end of the image is read, and when an image for a frame is read from the one of the image capturing elements 130A and 130B, a difference in time of exposure to light is generated within the frame, and a difference in time of (T9−T1) is generated between the lower end of the image and the upper end of the image.

When image correction (for example, blur correction) is to be performed on the frame, correction may be applied with reference to a time point within the frame (for example, T5 in the middle). However, in this case, even when correction is correctly performed in an area corresponding to a designated time, correction may be performed incorrectly due to the above-described difference in time in other areas.

Figure 26C:
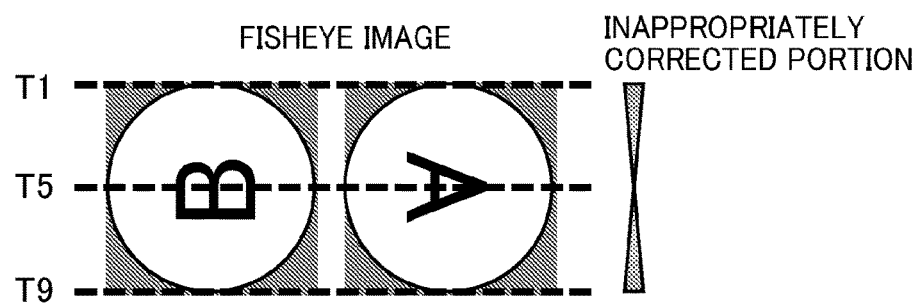
Figure 26D:

For example, it is assumed that, in a fisheye image as illustrated in FIG. 26(C), the scan times T1, T5, and T9 by the rolling shutter in FIG. 26(B) respectively correspond to the upper end of the image, the middle of the image, and the lower end of the image of the fisheye image. In this case, when a correction process is performed at the time T5 in the middle of the image, an inappropriately corrected portion (a portion of which correction is insufficient or excessive) is generated at the upper end T1 of the image and the lower end T9 of the image. Furthermore, when the fisheye image is converted into an equidistant cylindrical projection image as illustrated in FIG. 26(D), the inappropriately corrected portion becomes complicated.

Figures 27A, 27B, 28:
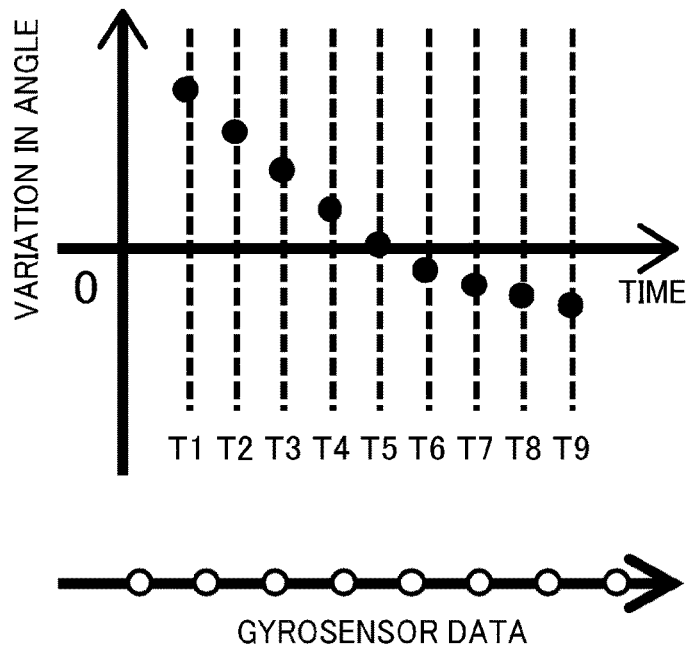
FIGS. 27A and 27B (FIG. 27) illustrate a process when image correction is blur correction regarding the rolling shutter according to a specific embodiment.
FIG. 28 illustrates an example of a format for conversion information that is recorded according to a specific example.

Referring to FIG. 27, the RS correction table calculation is described next. FIG. 27(A) illustrates an RS correction table for reducing influence on the blur correction by the rolling shutter. Times T1 to T9 along the horizontal axis correspond to scan times by the rolling shutter which has been described referring to FIG. 26. A variation in angle along the vertical axis is calculated from gyrosensor data sampled per certain period within a frame. The variation in angle involves values of three axes of X, Y, and Z, and represents variations in posture of the plurality of image capturing means. The variation in angle indicated in FIG. 27 is a value with reference to the time T5. That is, the variation in angle is 0 at the time T5. FIG. 27(B) is a table that represents the relationship in FIG. 27(A), and is an RS correction table referenced in step S603. In some cases, the correction value may vary due to assembly of an image capturing element. Hence, a table is prepared for each image capturing element. Moreover, the RS correction table is calculated per frame.

A blur correction process regarding the rolling shutter is described in more detail with reference to FIG. 25.

As illustrated in FIG. 25, the process is performed per pixel to be processed. In step S103, the first coordinate conversion is performed to change coordinate arrangement. In step S104, determination on an image before stitching is performed to determine an image before stitching (corresponding image capturing means) to which the pixel to be processed belongs.

In the blur correction regarding the rolling shutter, the coordinate values of the image before stitching in step S105 are acquired. Hence, information whether the coordinate values of the image before stitching are required is held in advance for the type of blur correction regarding the rolling shutter. The information is acquired when the execution of the blur correction regarding the rolling shutter is selected, the process of acquiring the coordinate values of the image before stitching is performed, and the coordinate values of the image before stitching corresponding to the pixel to be processed are acquired.

When the RS correction table is referenced in step S603, the RS correction table of the image before stitching (fisheye lens) determined in the determination on an image before stitching in step S104 is referenced to acquire an RS correction amount (correction value). A time (line) in the RS correction table is specified from the coordinate values of the image before stitching acquired in step S105, and the correction amount associated with the specified time and corresponding to the difference in time of exposure to light within the frame is acquired. Values set for the coordinate values of the image before correction in the correction table illustrated in FIG. 13 are obtained by converting coordinate values of an image after correction into coordinate values on a sphere in the three-dimensional orthogonal coordinate system, performing rotation conversion on the converted coordinate values in directions of three axes (X, Y, Z) using RS correction amounts (correction values of x, y, z), and restoring the converted coordinate values to coordinate values of an equidistant cylindrical projection image in a spherical coordinate system. In the blur correction regarding the rolling shutter, the pixel-values correction is not performed. Hence, setting with which pixel values are not corrected is made for the correction method in the correction table (for example, "1" indicative of addition as the correction mode and a correction amount 0). The step of referring to the RS correction table in step S603 corresponds to the correction-value calculation step in step S106.

The coordinate-value correction in step S107 acquires the coordinate values of the image before correction corresponding to the coordinate values of the pixel to be processed using the correction table. The coordinate values of the image before correction in the correction table differ from the coordinate values of the image after correction in the case of the blur correction, and hence coordinate-value correction is performed. Second coordinate conversion in step S108 performs a process of restoring the state rotated by the first coordinate conversion in step S103. Pixel-value acquisition in step S109 acquires pixel values of an image before correction. In step S110, the pixel values acquired by the pixel-value correction are corrected by the correction method in the correction table to obtain pixel values after correction. Since the blur correction regarding the rolling shutter has setting such that the pixel values are not corrected based on the correction method in the correction table, the pixel values of the image before correction acquired in step S109 directly serve as the pixel values of the image after correction. In the blur correction regarding the rolling shutter, step S109 may be omitted.

Applying the above-described blur correction regarding the rolling shutter to a moving image of a spherical image can provide a moving image of a spherical image with reduced blur in the entire frame.

Conversion Information: In the first coordinate conversion (S103) and the second coordinate conversion (S108) in FIG. 14, conversion information, such as a rotation axis, an angle of rotation, and zenith correction data, is required to perform coordinate conversion so that the stitching position is on the equatorial plane of the sphere. The user may have difficulty in calculating such conversion information. Moreover, values may vary depending on the model number or manufacturer of the spherical camera 110. Thus, conversion information is recorded in advance during capturing with the spherical camera 110, and hence the posterior image correction process can be performed without a troublesome work by the user.

FIG. 28 illustrates an example of a format of the conversion information. The conversion information is desirably recorded in association with an image during capturing with the spherical camera 110 together with the stitching table illustrated in FIG. 12. When the coordinate values with the process of the first coordinate conversion applied using the stitching table in FIG. 12 are set as the coordinate values of the image after correction, coordinate conversion can be performed even without the conversion information.

Figure 29:
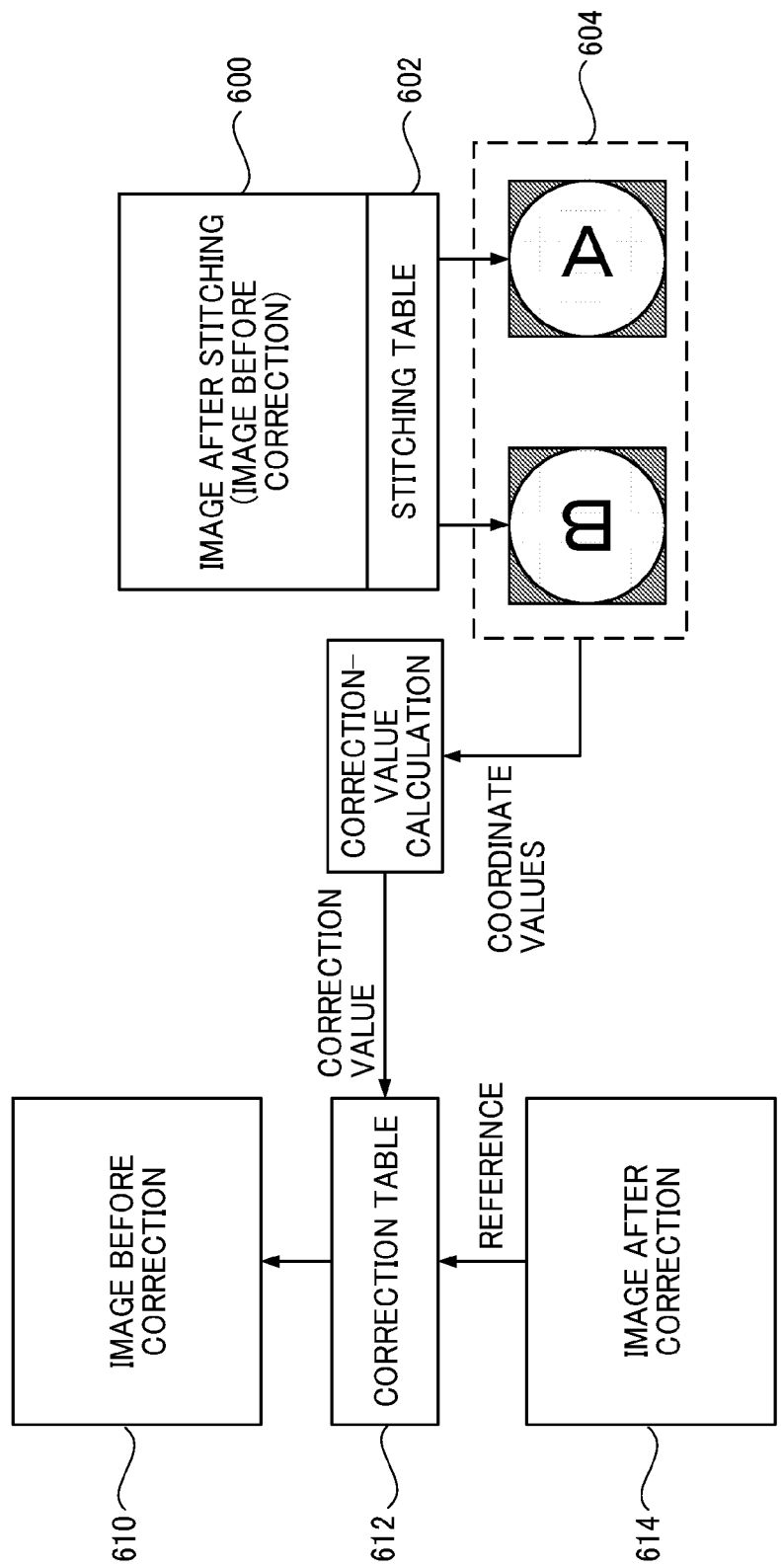
FIG. 29 illustrates table dependence relating to the image correction process according to the embodiment.

Attachment of Correction Table to Image after Correction: FIG. 29 illustrates table dependence relating to an image correction process according to the embodiment. A stitching table 602 as, for example, metadata of an image after stitching (an image before correction) 600 is saved during capturing. The stitching table 602 that holds the correspondence with a fisheye image 604 is used for calculating a correction value, and the calculated correction value is set in a correction table 612. Thus, image correction is applied based on the correction table 612 to obtain an image after correction 614 from an image before correction 610.

When it is desirable to correct again the image after correction, a case may be expected where the coordinate values have been changed from initial coordinate values by the previous correction process and are not appropriately corrected. To avoid such a defective case, according to a desirable embodiment, the correction table 612 used for the correction is saved together with the stitching table 602 in association with the image after correction 614.

Figure 30:
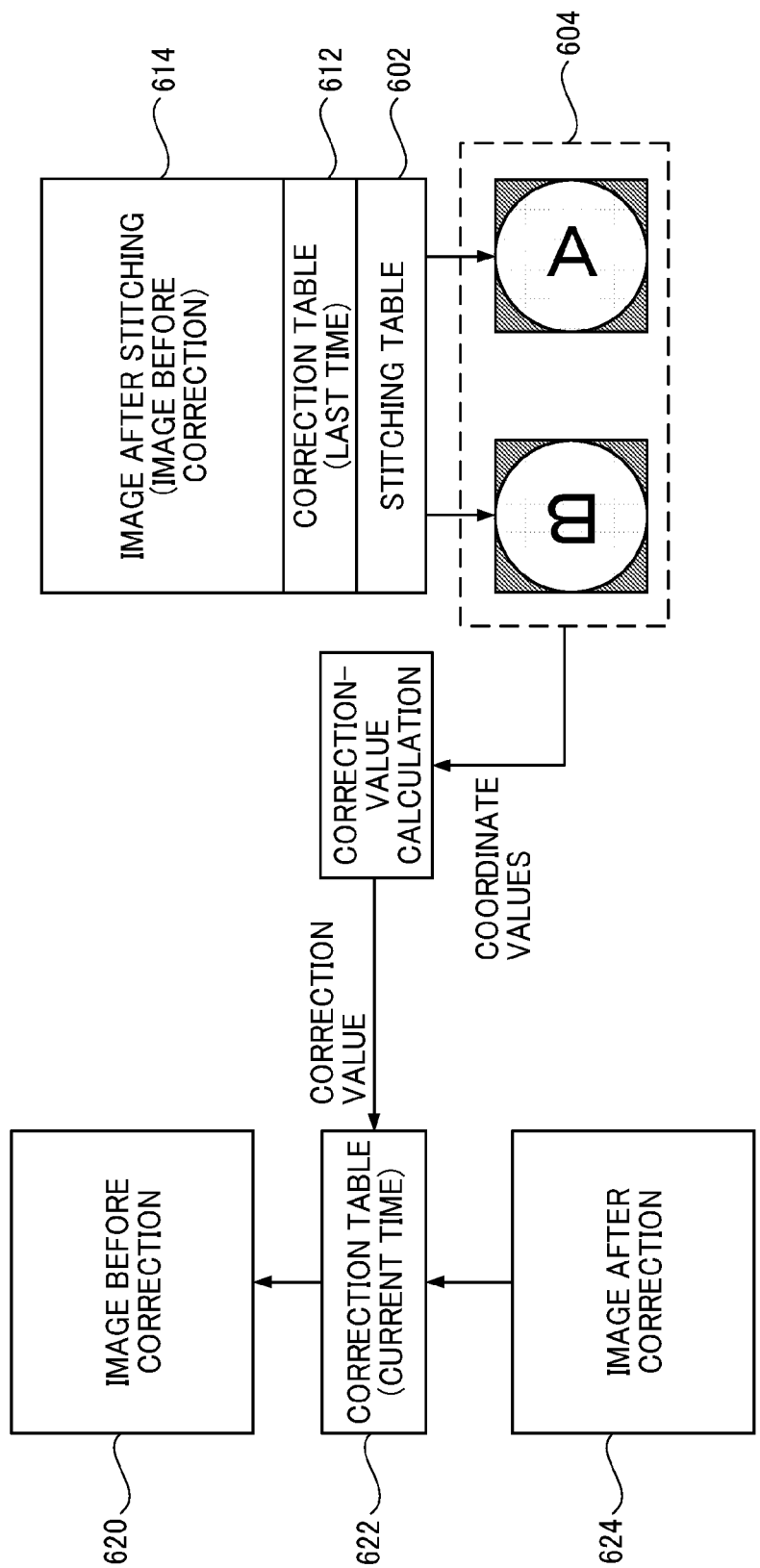
FIG. 30 illustrates table dependence when image correction is performed again according to the embodiment.

FIG. 30 illustrates table dependence when image correction is performed again. The table dependence illustrated in FIG. 30 differs from that in FIG. 29. In the case of FIG. 30, a correction table 612 saved together with a previous image after correction (image subjected to current image correction (image after stitching)) 614 is referenced before a stitching table 602 is referenced. Then, the correction value calculated with reference to the correction table 612 and the stitching table 602 is set in a current correction table 622 to perform image correction on an image before correction 620 and to obtain an image after correction 624. Thus, the correction value can be calculated without the influence of the previous correction process (mainly the coordinate-value correction).

Figure 31:
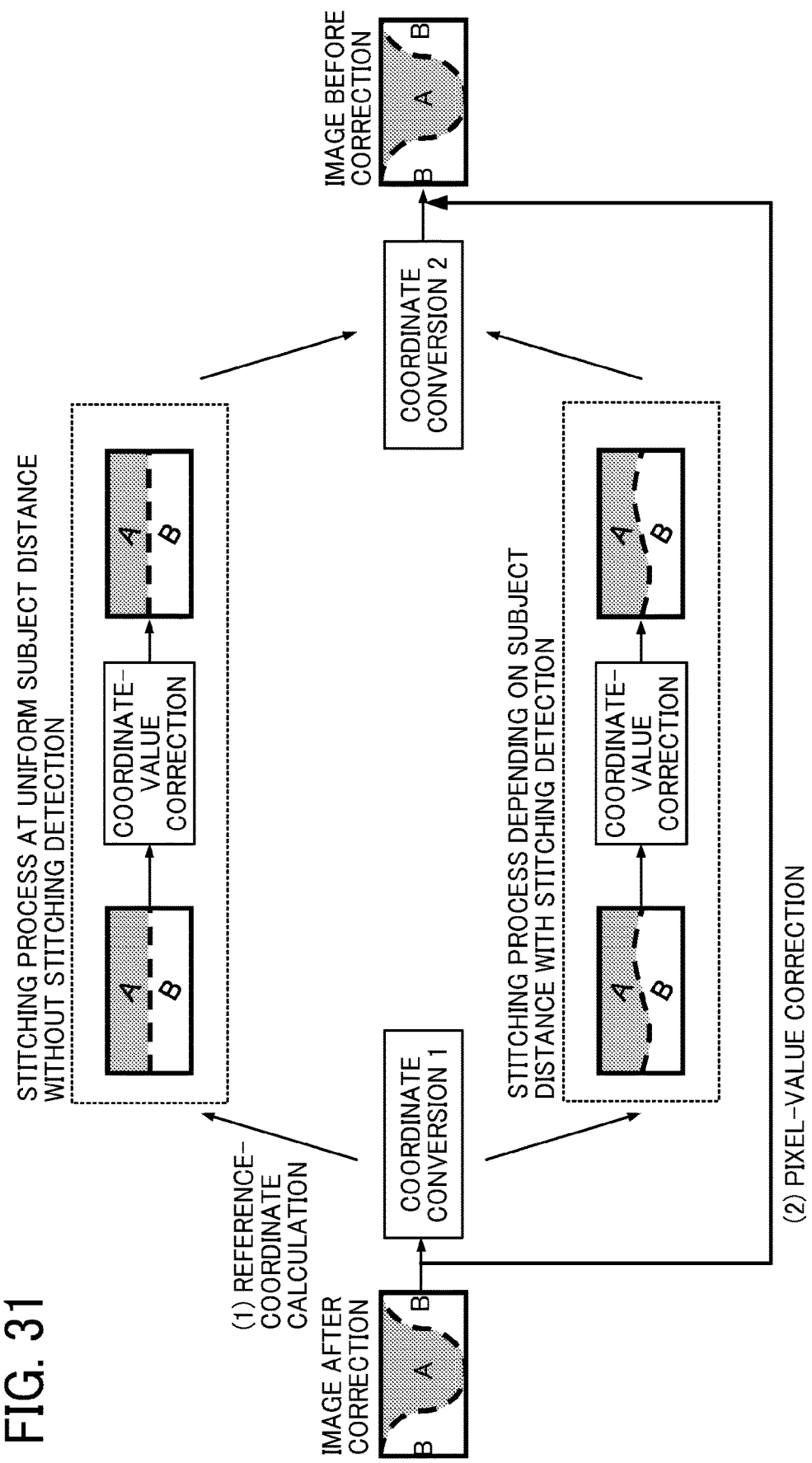
FIG. 31 illustrates an overview of the flow of the posterior image correction process according to the embodiment.

FIG. 31 illustrates an overview of the flow of a posterior image correction process according to the embodiment. In the image correction process, a process is executed in the order of (1) reference-coordinate calculation and (2) pixel-value correction. Referring to FIG. 31, arrows represent reference destinations. Pixel values of coordinate values obtained by the above-mentioned (1) reference-coordinate calculation are acquired from an image before correction and the above-mentioned (2) pixel-value correction is applied to the acquired pixel values. When the coordinate-value correction is not performed, the above-mentioned (1) reference-coordinate calculation is not necessarily required, and may use coordinate values of a pixel to be processed of an image after correction.

The first coordinate conversion and the second coordinate conversion are applied for temporal conversion into the state in which the image area A covers the upper half portion and the image area B covers the lower half portion. This is because the stitching table illustrated in FIG. 12(A) is configured such that the image area A covers the upper half portion and the image area B covers the lower half portion, and the stitching position is on the equator when mapping is performed with the stitching table. The relationship between the image before stitching and the image after stitching is determined with the stitching table illustrated in FIG. 12(A), and hence the calculation of the coordinate-value correction can be easily performed when the states of images after stitching are aligned to calculate the coordinate-value correction. The stitching table may be a table with different mapping. However, in view of reducing complexity, based on an assumption that the first coordinate conversion and the second coordinate conversion are applied, it is desirable to store a stitching table in which the above-described stitching position is stored in a manner associated with image data so that the stitching position is on the equator.

As described above, with the above-described embodiment, an image processing device, an image processing method, an image capturing apparatus, an image processing system, and a program capable of applying an image correction technique depending on a plurality of image capturing means to an image captured using the plurality of image capturing means, can be provided.

In the above-described embodiment, an image capturing means (a pair of an image capturing element and an optical system) used for capturing is determined from coordinate values of a stitched image (a still image or a moving image), and the image correction process is performed in accordance with the determined image capturing means. Thus, an image correction technique dependent on an image capturing means can be applied to a still image or a moving image that has been captured by a plurality of image capturing means and that has been stitched. In particular, a latest image correction technique can be applied to a still image or a moving image saved in the past. Moreover, it is not required to additionally hold an image before stitching, and an increase in capacity of a storage can be avoided, thereby reducing the cost.

The case where the posterior image correction process is performed in the spherical camera 110 while the spherical camera 110 serves as an example of an image processing device and an image processing system has been described. However, the configurations of the image processing device and the image processing system that posteriorly perform the image correction process are not limited to the above-described configurations.

Figure 2B:
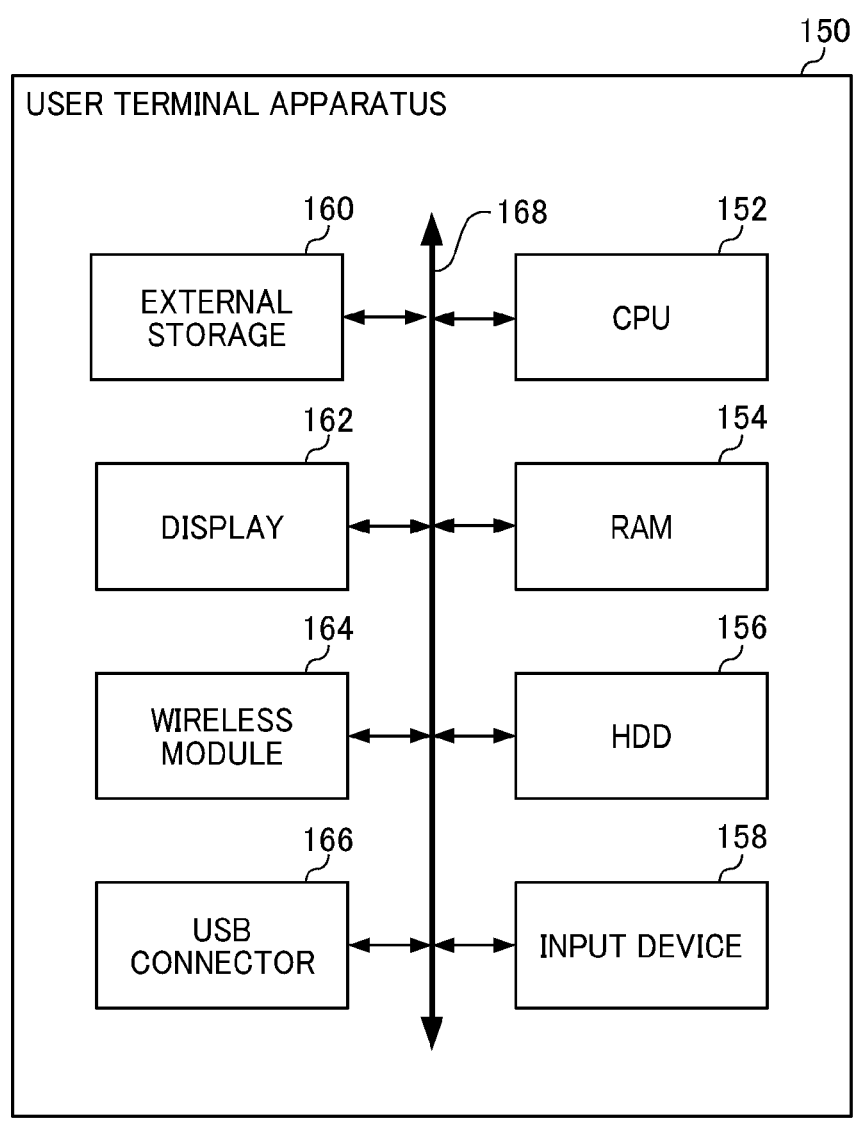
FIG. 2B illustrates a hardware configuration of a user terminal apparatus according to another embodiment.

FIG. 2B illustrates a hardware configuration of a user terminal apparatus 150 as an image processing device and an image processing system according to another embodiment. The user terminal apparatus 150 illustrated in FIG. 2B includes a CPU 152, a random access memory (RAM) 154, a hard disk drive (HDD) 156, an input device 158, an external storage 160, a display 162, a wireless module 164, and a USB connector 166, which are connected to via a bus 168.

The CPU 152 controls operations of components and an overall operation of the user terminal apparatus 150. The RAM 154 provides a work area of the CPU 152. The HDD 156 stores an operating system written in a code readable by the CPU 152 and programs such as an application that is in charge of the processes of the above-described image-correction processing unit 350 according to the embodiment.

The input device 158 is an input device, such as a mouse, a keyboard, a touchpad, or a touchscreen, and provides a user interface. The external storage 160 is a recording medium detachably attached to a memory card slot, and records various types of data, such as image data in a moving image format and still image data. The wireless module 164 establishes connection of wireless local area network (LAN) communication with an external apparatus such as the spherical camera 110. The USB connector 166 establishes USB connection with an external apparatus such as the spherical camera 110. For example, the wireless module 164 and the USB connector 166 are illustrated. However, the standard of connection is not limited to a specific standard, and connection with an external apparatus may be provided by other wireless communication such as Bluetooth (registered trademark) or a wireless USB, or wired communication such as a wired LAN.

The display 162 provides displaying of an operation screen for user's operation, displaying of a monitor image of a captured image with the spherical camera 110 before capturing or during capturing, and displaying for reproduction and browsing of a saved moving image or still image. The user can give a capturing instruction and can change various types of setting with respect to the spherical camera 110 by the display 162 and the input device 158 through the operation screen.

When the power is supplied to the user terminal apparatus 150 and the power supply is turned on, a program is read from the ROM or HDD 156 and is loaded in the RAM 154. The CPU 152 controls operations of components of the apparatus in accordance with the program loaded in the RAM 154, and temporarily stores data required for control in the memory. Thus, the above-described image-correction processing unit 350 and the process thereof are implemented.

Moreover, according to another embodiment, image processing excluding the above-described partial-image acquisition process 210 may be discretely mounted on an image processing device, such as at least one external PC or at least one external server including the user terminal apparatus 150. For example, according to a specific embodiment, image processing 220 to 280 can be executed in the user terminal apparatus 150 serving as the image processing device. The above-described image processing 280 may be mounted in a distributed manner on an image processing device, such as at least one external PC or at least one external server including the user terminal apparatus 150.

Furthermore, in the above-described embodiment, the inclination angle is obtained with reference to the vertical direction in the zenith correction. However, a direction other than the vertical direction, for example, the horizontal direction or another desirable direction may be set as the reference direction, and an inclination of an image may be corrected based on an inclination of a predetermined object, such as the spherical camera 110 or the image capturing element 130A, 130B. In the above-described embodiment, the acceleration sensor and the gyrosensor are used for detection of an inclination. Alternatively, another inclination sensor, such as a combination of an acceleration sensor and a geomagnetic sensor, a combination of a gyrosensor and a geomagnetic sensor, or a combination of an acceleration sensor, a gyrosensor, and a geomagnetic sensor, may detect the inclination of the spherical camera 110, the image capturing elements 130A and 130B secured at the spherical camera 110, and the sensor. In this case, rotation correction to correct rotation around the vertical direction can be applied in addition to the zenith correction.

The above-described functional units may be implemented by a computer-executable program written in a legacy programming language, such as assembler, C, C++, C#, or Java (registered trademark), or an object-oriented programming language. A program for executing the functional units may be stored in and distributed through a device-readable recording medium such as a ROM, an electrically erasable programmable read-only memory (EEPROM), an erasable programmable read-only memory (EPROM), a flash memory, a flexible disk, a compact disc ROM (CD-ROM), a CD Rewritable (CD-RW), a digital versatile disc ROM (DVD-ROM), a DVD-RAM, a DVD-RW, a Blu-ray disc, a secure digital (SD) card, or a magneto-optical (MO) disc, or may be distributed via a telecommunications line. Furthermore, some or all of the above-described functional units may be mounted on a programmable device (PD) such as a field programmable gate array (FPGA) or implemented as an application specific integrated circuit (ASIC). Alternatively, the above-described functional units may be distributed through a recording medium as circuit configuration data (bit stream data) to be downloaded into a PD to implement the functional units on the PD, or data written in a hardware description language (HDL), a very high speed integrated circuits hardware description language (VHDL), or Verilog-HDL to generate the circuit configuration data.

While the embodiments of the disclosure have been described, the disclosure is not limited to the embodiments described above, and modifications such as adding another embodiment, changing an embodiment, or deleting an embodiment may be made so long as such modifications can be made by a person skilled in the art, and any aspect that achieves the operations and effects of the disclosure is included in the scope of the disclosure.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to Japanese Patent Application No. 2020-041189, filed on Mar. 10, 2020, in the Japan Patent Office, the entire disclosure of which is hereby incorporated by reference herein.

REFERENCE SIGNS LIST

12. image capturing device, 14. housing, 18. operation button, 20. image forming optical system, 22. image capturing element, 110. spherical camera, 112. CPU, 114. ROM, 116. image processing block, 118. moving-image compression block, 119. still-image compression block, 120. DRAM interface, 122. external storage interface, 124. external sensor interface, 126. USB interface, 128. serial block, 129. video output interface, 130. image capturing element, 132. DRAM, 134. external storage, 136. acceleration sensor, 137. gyrosensor, 138. USB connector, 140. wireless module, 142. bus, 150. user terminal apparatus, 152. CPU, 154. RAM, 156. HDD, 158. input device, 160. external storage, 162. display, 164. wireless module, 166. USB connector, 168. bus, 200. image process, 210. partial-image acquisition process, 220. stitching-position detection process, 230. inclination detection process, 240. stitching parameter, 250. stitching process, 260. data output process, 270. image storage, 280. image correction process, 300. image processing block, 302. position-detection distortion correction unit, 304. stitching-position detection unit, 306. table correction unit, 308. table generation unit, 310. inclination detection unit, 312. image-combination distortion correction unit, 314. image combination unit, 316. image extraction unit, 322. monitor-image generation unit, 330. position-detection conversion table, 332. stitching-position detection result, 334. inclination detection result, 336. image-combination conversion table, 350. image-correction processing unit, 352. image input unit, 354. coordinate conversion unit, 356. determination unit, 358. image correction unit, 500. image for template, 502. template image, 510. image for search, 512. search range, 514. corresponding portion.

The invention claimed is:

1. An image processing device comprising:
   determination circuitry configured to determine image capturing circuitry used for capturing at least one particular portion in a combined image in which a first partial image captured using first image capturing circuitry and a second partial image captured using second image capturing circuitry are stitched together; and
   correction circuitry configured to
      generate a correction table which includes for each set of coordinates in the combined image after an image correction, coordinates in the combined image before the image correction, a format designation value for designating a format of the correction, and an image correction amount of the image correction in the format designated using the format designation value; and
      apply the image correction to the combined image based on the correction table to correct the combined image.

2. The image processing device according to claim 1, wherein the image correction includes coordinate correction on a pixel constituting the combined image.

3. The image processing device according to claim 2, further comprising:
   first coordinate conversion circuitry for applying first coordinate conversion on coordinates of the at least one particular portion in the combined image before application of the coordinate correction; and
   second coordinate conversion circuitry for applying second coordinate conversion on coordinates obtained by application of the coordinate correction, the second coordinate conversion being configured to apply coordinate conversion reversal of the first coordinate conversion.

4. The image processing device according to claim 3, wherein the first coordinate conversion and the second coordinate conversion each include rotation conversion.

5. The image processing device according to claim 4, wherein determination of the determination circuitry is performed based on coordinates obtained by application of the rotation conversion of the first coordinate conversion.

6. The image processing device according to claim 3, wherein the combined image is an image in which distortion correction is applied to the first partial image and the second partial image and the first partial image and the second partial image are stitched together at a stitching position per area, and the first coordinate conversion and the second coordinate conversion each include stitching conversion based on the stitching position per area.

7. The image processing device according to claim 2, wherein
   the coordinate correction is performed based on a pixel position in the image capturing circuitry associated based on a determination result of the determination circuitry, and
   information in which the particular portion in the combined image is associated with a pixel position in the first partial image or a pixel position in the second partial image is provided together with the combined image.

8. The image processing device according to claim 7, wherein the coordinate correction is blur correction and is performed according to a correction amount corresponding to a difference in time of exposure to light within a frame, based on the image capturing circuitry determined by the determination circuitry and the pixel position.

9. The image processing device according to claim 1, wherein the image correction includes pixel-value correction on a pixel constituting the combined image.

10. The image processing device according to claim 9, wherein the pixel-value correction is performed based on coordinates of the particular portion in the combined image, or a pixel position in the first partial image or a pixel position in the second partial image associated with the particular portion in the combined image.

11. The image processing device according to claim 10, wherein the pixel-value correction is light-intensity correction and is performed according to a correction amount corresponding to an image height, based on the image capturing circuitry determined by the determination circuitry, and coordinates of the particular portion in the combined image or the pixel position.

12. The image processing device according to claim 1, further comprising:
    an information reader to read information relating to the first image capturing circuitry and the second image capturing circuitry, wherein
    the information relating to the first image capturing circuitry and the second image capturing circuitry includes at least one piece of information selected from information in which the particular portion in the combined image is associated with a pixel position in the first partial image or in the second partial image, information on coordinate conversion applied to the combined image, and information on variations in posture of the first image capturing circuitry and the second image capturing circuitry.

13. The image processing device according to claim 1, further comprising:
    output circuitry configured to output correction data that holds, for each of sets of coordinates in the combined image after correction, coordinates in the combined image before the correction, a format designation value for designating a format of the correction, and a correction amount of the correction in the format designated using the format designation value.

14. The image processing device according to claim 1, wherein the image correction includes first image correction and second image correction, and the first image correction and the second image correction are directly applied in a superimposed manner, or are executed such that the first image correction is applied to obtain an intermediate image and the second image correction is applied to the intermediate image.

15. An image capturing apparatus, comprising:
    the image processing device according to claim 1;
    first image capturing circuitry for capturing a first partial image;
    second image capturing circuitry for capturing a second partial image; and
    recording circuitry for recording the combined image in which the first partial image and the second partial image are stitched together.

16. An image processing method for processing a combined image in which a first partial image captured using first image capturing circuitry and a second partial image captured using second image capturing circuitry are stitched together, the image processing method comprising:
    determining image capturing circuitry used for capturing at least one particular portion in the combined image;
    generating a correction table which includes, for each set of coordinates in the combined image after an image correction, coordinates in the combined image before the image correction, a format designation value for designating a format of the correction, and an image correction amount of the image correction in the format designated using the format designation value; and
    applying the image correction on the combined image based on the correction table to correct the combined image.

17. The image processing method according to claim 16, wherein the image correction includes one or both of coordinate correction on a pixel constituting the combined image and pixel-value correction on a pixel constituting the combined image.

18. A non-transitory computer readable medium storing computer readable code which, when executed by a computer system, cause the computer system to:
    determine image capturing circuitry used for capturing at least one particular portion in a combined image in which a first partial image captured using first image capturing circuitry and a second partial image captured using second image capturing circuitry are stitched together; and
    generate a correction table which includes, for each set of coordinates in the combined image after an image correction, coordinates in the combined image before the image correction, a format designation value for designating a format of the correction, and an image correction amount of the image correction in the format designated using the format designation value; and
    apply the image correction to the combined image based on the correction table to correct the combined image.

* * * * *